United States Patent
King et al.

(10) Patent No.: US 10,125,206 B1
(45) Date of Patent: Nov. 13, 2018

(54) NON-HALOGENATED FLAME RETARDANT HINDERED AMINE LIGHT STABILIZER IMPACT MODIFIERS

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/673,500

(22) Filed: Aug. 10, 2017

(51) Int. Cl.
*C08F 230/02* (2006.01)
*C09K 21/14* (2006.01)

(52) U.S. Cl.
CPC ............ *C08F 230/02* (2013.01); *C09K 21/14* (2013.01)

(58) Field of Classification Search
CPC .............................. C08F 230/02; C09K 21/14
See application file for complete search history.

(56) References Cited

U.S. PATENT DOCUMENTS

| | | | |
|---|---|---|---|
| 4,824,884 A | 4/1989 | MacLeay et al. | |
| 4,857,595 A | 8/1989 | Kazmierzak et al. | |
| 4,863,999 A | 9/1989 | MacLeay et al. | |
| 5,145,893 A | 9/1992 | Galbo et al. | |
| 5,981,635 A | 11/1999 | Hayes | |
| 5,990,209 A | 11/1999 | Rubino et al. | |
| 2010/0324182 A1 | 12/2010 | Ing.Roth | |
| 2011/0223419 A1 | 9/2011 | Okawara et al. | |
| 2012/0245318 A1 | 9/2012 | Nakaya et al. | |
| 2013/0059952 A1 | 3/2013 | Pfaendner et al. | |
| 2014/0203226 A1 | 7/2014 | Takenaka et al. | |
| 2016/0176855 A1 | 6/2016 | Kröhnke et al. | |
| 2016/0229989 A1 | 8/2016 | Lips et al. | |

FOREIGN PATENT DOCUMENTS

| | | |
|---|---|---|
| CA | 1 227 598 A | 9/1987 |
| EP | 0 084 882 A1 | 8/1983 |
| EP | 0 337 431 A2 | 10/1989 |
| EP | 0 499 581 A1 | 2/1991 |
| JP | 63152610 A | 6/1988 |
| JP | 10176016 A | 6/1998 |
| JP | 2001-026623 A | 1/2001 |
| JP | 2003-066561 A | 3/2003 |
| JP | 2003-137947 A | 5/2003 |
| JP | 2003-192742 A | 7/2003 |
| JP | 2010-020866 A | 1/2010 |
| JP | 2010-042517 A | 2/2010 |
| JP | 2010-044097 A | 2/2010 |
| JP | 2016-117865 A | 6/2016 |
| WO | WO-1996-021696 A1 | 7/1996 |
| WO | WO-2010-016376 A1 | 2/2010 |
| WO | WO-2010-074066 A1 | 7/2010 |
| WO | WO-2011-086114 A1 | 7/2011 |

OTHER PUBLICATIONS

Appendix P; List of IBM Patent or Applications Treated as Related, Sep. 21, 2017, 2 pages.
Gijsman et al., *Hindered amine light stabilizers: An alternative for radiation cross-linked UHMwPE implants*, Biomaterials, vol. 31, Issue 26, Sep. 2010, pp. 6685-6691, ScienceDirect.com (online), Elsevier Ltd, The Netherlands.
Dintcheva et al., *Multi-functional hindered amine light stabilizers-functionalized carbon nanotubes for advanced ultra-high molecular weight Polyethylene-based nanocomposites*, Composites Part B: Engineering, vol. 82, Dec. 2015, pp. 196-204, ScienceDirect.com (online), Elsevier Ltd, The Netherlands.
Desai et al., *A novel photoadditive for polyolefin photostabilization: hindered amine light stabilizer*, Macromolecular Symposia, vol. 169, Issue 1, May 2001, pp. 121-128, Wiley-VCH Verlag GmbH & Co. KGaA, Weinheim.
Ávár et al., *Studies on the interaction of photoreactive light stabilizers and UV-absorbers*, Progress in Organic Coatings, vol. 35, Issues 1-4, pp. 11-17, ScienceDirect.com (online), Elsevier Ltd, The Netherlands.
U.S. Appl. No. 15/814,947, to Scott B. King et al., entitled, *Non-Halogenated Flame Retardant Hindered Amine Light Stabilizer Impact Modifiers*, assigned to International Business Machines Corporation, 79 pages.
U.S. Appl. No. 15/711,048, to Scott B. King et al., entitled, *Non-Halogenated Flame Retardant Hindered Amine Light Stabilizer Cross-Linkers*, assigned to International Business Machines Corporation, 59 pages.
Sabo, Hindered Amine Light Stabilizers, Sabo.com (online), accessed Mar. 6, 2017, 2 pages, URL: www.sabo.com/sabo/products_and_markets.php?market_id=5&family_id=37.
Donohue, *Hindered Amine Light Stabilizers Form Cytotoxic Hydroxylamines as they Protect the Polymer from Radiation Damage Without Discoloration*, Figure 36 of 56, Micro ftir5-Measuring radiation effects, durometer, SlideShare.net (online), Dec. 7, 2015, 1 page, URL: www.slideshare.net/JohnDonohue2/micro-ftir5measuring-radiation-effectsdurometer.
Gray et al., *The Influence of Flame Retardant Structure on UV Stabilization Approaches in Polypropylene*, Journal of Vinyl & Additive Technology, vol. 2, No. 1, Mar. 1996, pp. 63-68, John Wiley and Sons, Hoboken, NY.
PVC, *Property modification of PVC products*, pvc.org (online), accessed Apr. 19, 2017, 5 pages, URL: www.pvc.org/en/p/property-modification-of-pvc-products.

(Continued)

*Primary Examiner* — John M Mauro
(74) *Attorney, Agent, or Firm* — Roy R. Salvagio; Nathan M. Rau; Kennedy Lenart Spraggins LLP

(57) ABSTRACT

A process of forming a non-halogenated flame retardant hindered amine light stabilizer (HALS) impact modifier is disclosed. The process includes forming a mixture of monomers that includes an acryloyl-functionalized 2,2,6,6-tetramethylpiperidine (TMP) monomer, a styrene monomer, a butadiene monomer, and a phosphorus-functionalized monomer. The process also includes initiating a polymerization reaction of the mixture of monomers to form a non-halogenated flame retardant HALS impact modifier.

17 Claims, 18 Drawing Sheets

(56) References Cited

OTHER PUBLICATIONS

Efra, *Flame Retardant types and applications—What is the mode of action of flame retardants?*, Flame Retardants—Frequently Asked Questions, pp. 14, The European Flame Retardants Association (online), accessed Apr. 19, 2017, URL: www.flameretardants-online.com/images/itempics/2/9/1/item_18192_pdf_1.pdf.

Scifinder, Results of SciFinder Search of Polymetric Materials, Feb. 2017, SciFinder.com (online), 11 pages, American Chemical Society (ACS), Washington, D.C.

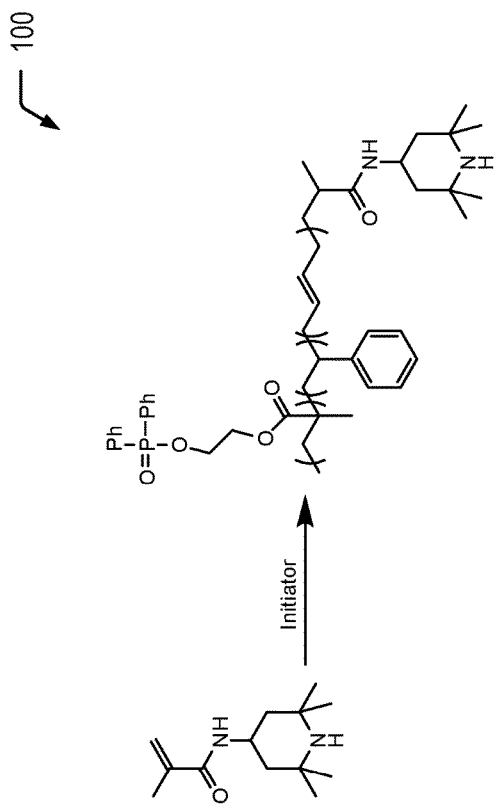
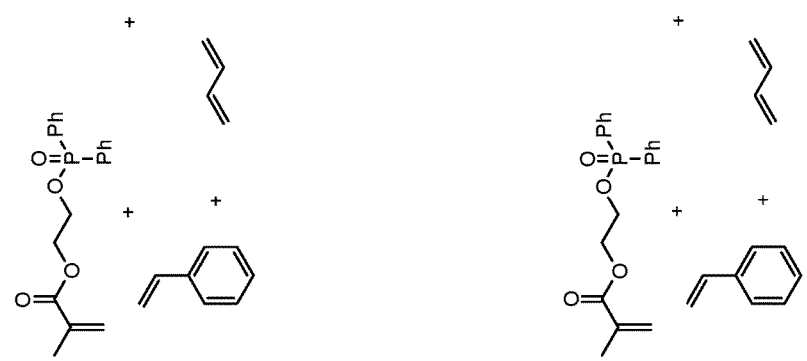
FIG. 1A
FIG. 1B

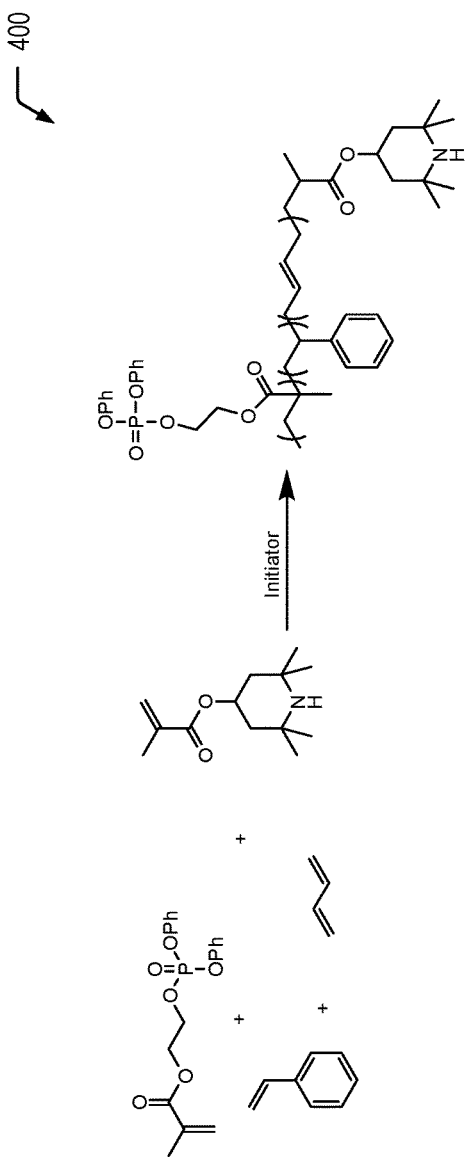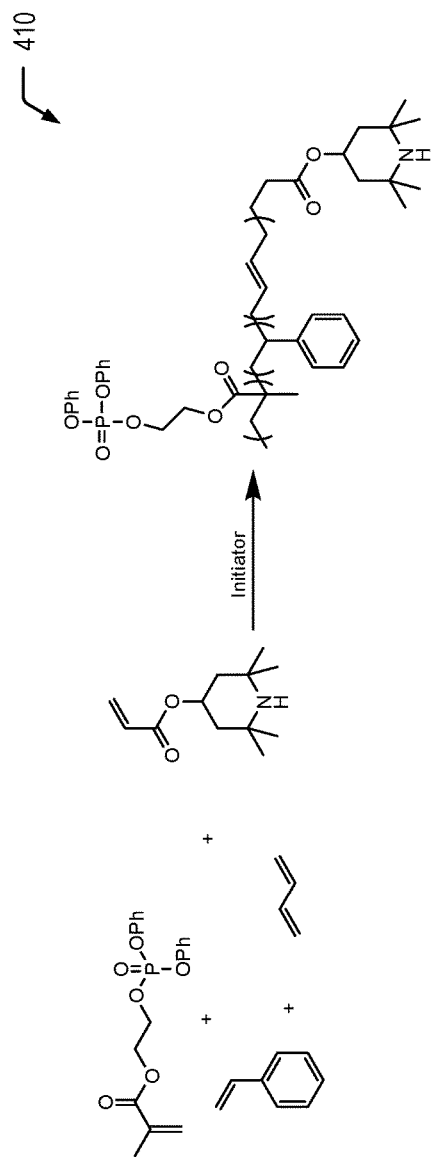
FIG. 4A
FIG. 4B

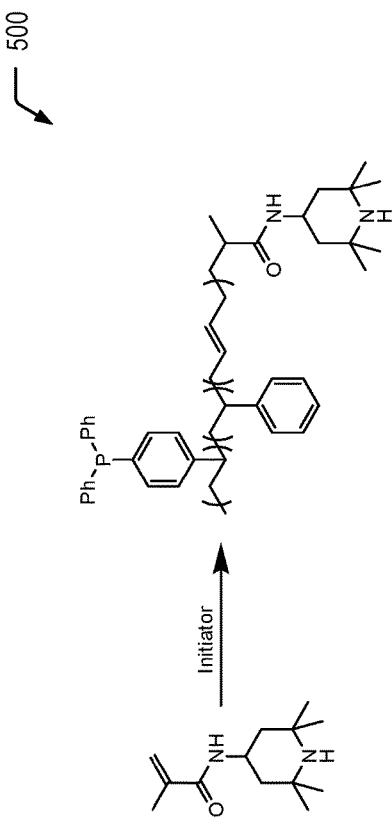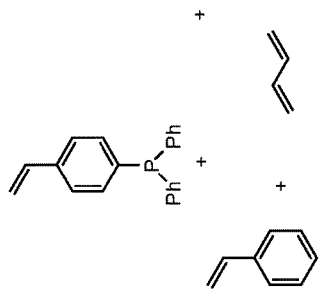
FIG. 5A
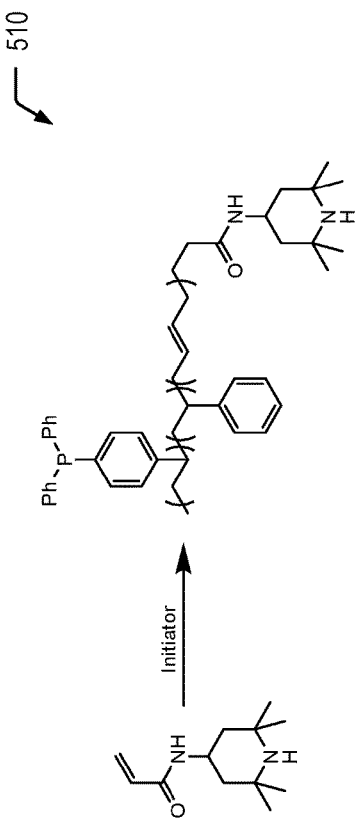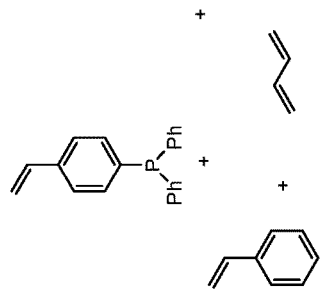
FIG. 5B

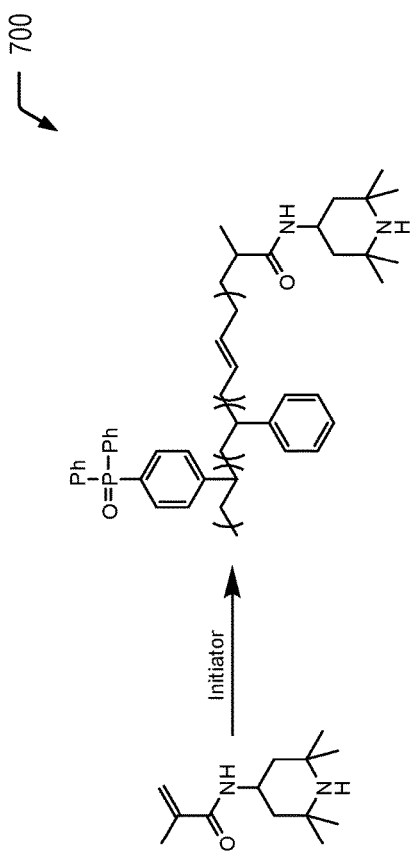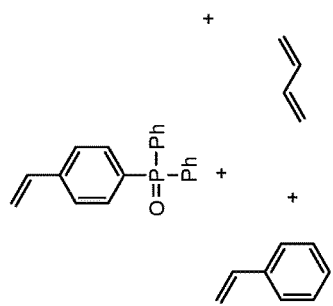
FIG. 7A
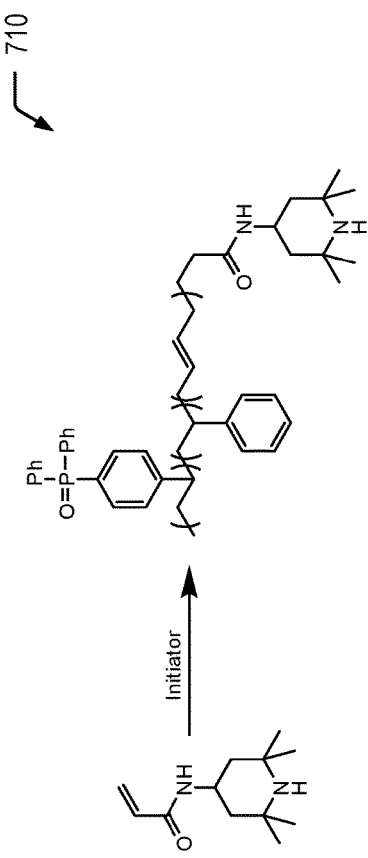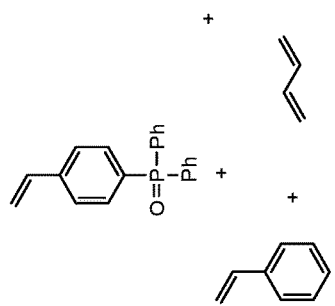
FIG. 7B

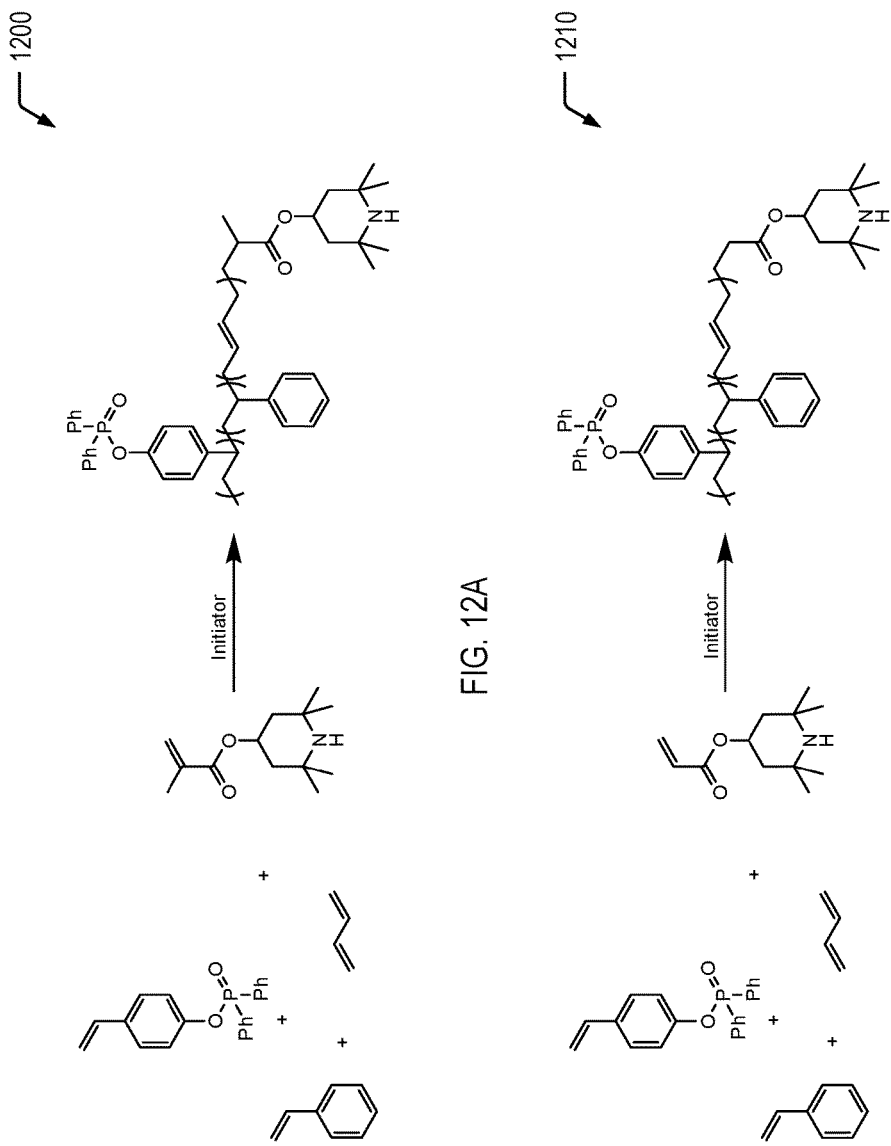

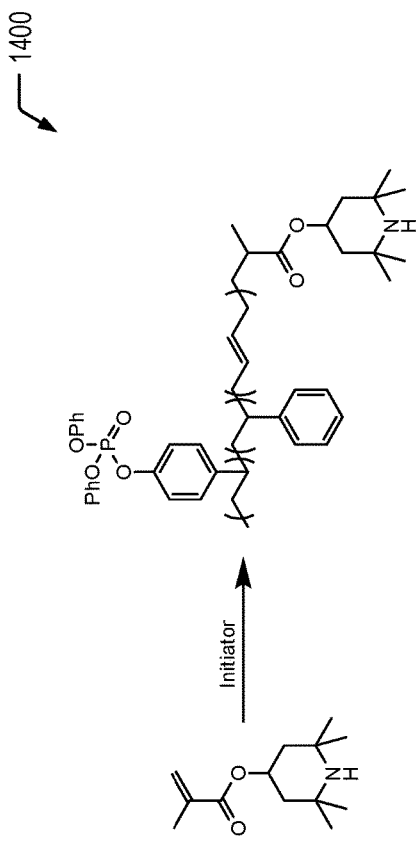
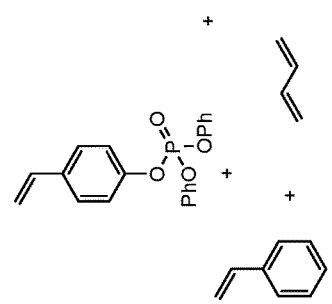
FIG. 14A
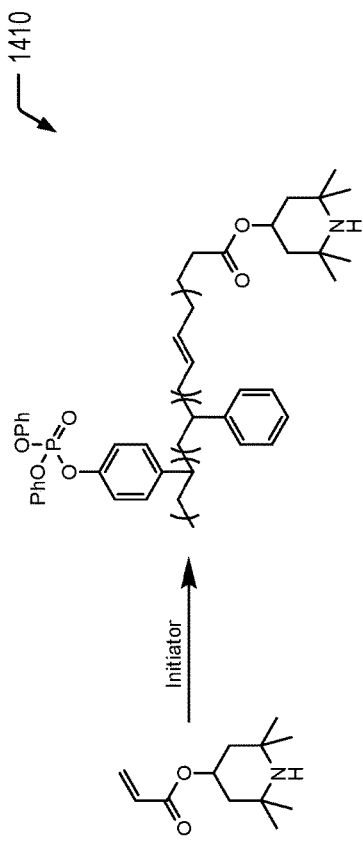
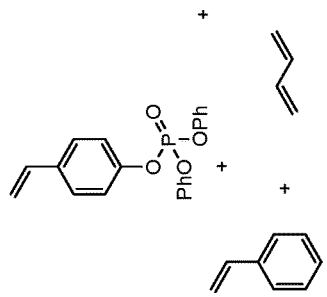
FIG. 14B

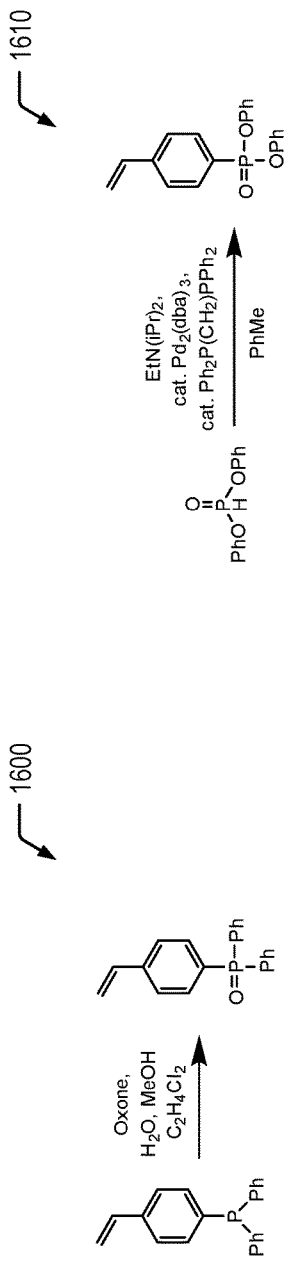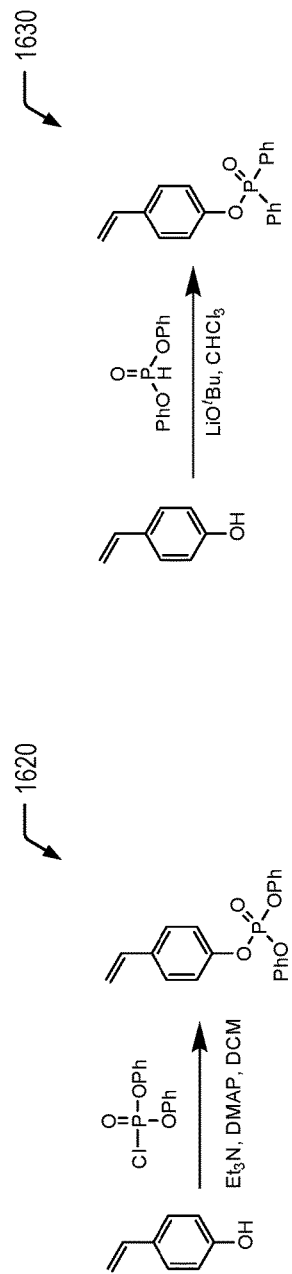
FIG. 16B
FIG. 16D
FIG. 16A
FIG. 16C

NON-HALOGENATED FLAME RETARDANT HINDERED AMINE LIGHT STABILIZER IMPACT MODIFIERS

BACKGROUND

Hindered amine light stabilizer ("HALS") molecules may be added to a polymer in order to protect the polymer from radiation damage, such as ultraviolet (UV) degradation of the polymer. HALS molecules are believed to provide protection from radiation damage by terminating photo-oxidation processes in polymers through chemical reaction with free radical and peroxide intermediates. A common approach to render a polymer flame retardant is by incorporation of additives such as halogenated (e.g., brominated) materials. In some cases, brominated flame retardant additives may release bromine radicals that may react directly with the HALS molecules or may abstract a hydrogen from the polymer matrix and deactivate the HALS molecules through an acid-base reaction. The result is loss of light stabilization and rapid UV degradation of the unprotected polymer.

SUMMARY

According to an embodiment, a process of forming a non-halogenated flame retardant (FR) hindered amine light stabilizer (HALS) impact modifier is disclosed. The process includes forming a mixture of monomers that includes an acryloyl-functionalized 2,2,6,6-tetramethylpiperidine (TMP) monomer, a styrene monomer, a butadiene monomer, and a phosphorus-functionalized monomer. The process also includes initiating a polymerization reaction of the mixture of monomers to form a flame retardant HALS impact modifier.

According to another embodiment, a non-halogenated flame retardant HALS impact modifier is disclosed having the following formula:

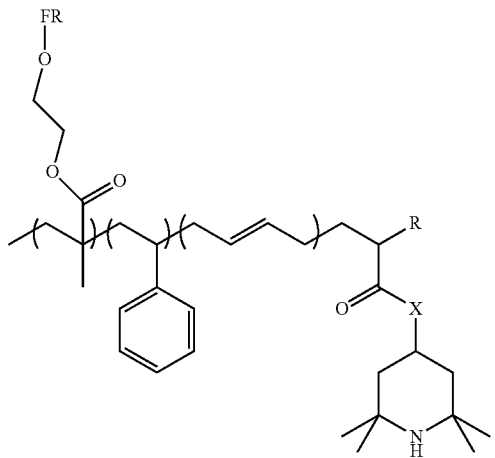

In the above formula, R corresponds to H or $CH_3$, X corresponds to O or NH, and FR corresponds to a phosphorus-containing flame retardant moiety.

According to yet another embodiment, a non-halogenated flame retardant HALS impact modifier is disclosed having the following formula:

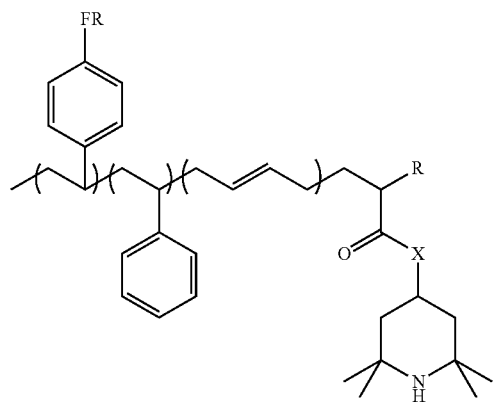

In the above formula, R corresponds to H or $CH_3$, X corresponds to O or NH, and FR corresponds to a phosphorus-containing flame retardant moiety.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 1A is a chemical reaction diagram illustrating a process of forming a non-halogenated FR HALS impact modifier from a first acryloyl-functionalized TMP monomer and a first phosphorus-functionalized acrylate monomer, according to one embodiment.

FIG. 1B is a chemical reaction diagram illustrating a process of forming a non-halogenated FR HALS impact modifier from a second acryloyl-functionalized TMP monomer and the first phosphorus-functionalized acrylate monomer of FIG. 1A, according to one embodiment.

FIG. 4A is a chemical reaction diagram illustrating a process of forming a non-halogenated FR HALS impact modifier from the third acryloyl-functionalized TMP monomer of FIG. 2A and the second phosphorus-functionalized acrylate monomer of FIGS. 3A and 3B, according to one embodiment.

FIG. 4B is a chemical reaction diagram illustrating a process of forming a non-halogenated FR HALS impact modifier from the fourth acryloyl-functionalized TMP monomer of FIG. 2B and the second phosphorus-functionalized acrylate monomer of FIGS. 3A and 3B, according to one embodiment.

FIG. 5A is a chemical reaction diagram illustrating a process of forming a non-halogenated FR HALS impact modifier from the first acryloyl-functionalized TMP monomer (depicted in FIGS. 1A and 3A) and a first phosphorus-functionalized styrenic monomer, according to one embodiment.

FIG. 5B is a chemical reaction diagram illustrating a process of forming a non-halogenated FR HALS impact modifier from the second acryloyl-functionalized TMP monomer (depicted in FIGS. 1B and 3B) and the first phosphorus-functionalized styrenic monomer of FIG. 5A, according to one embodiment.

FIG. 7A is a chemical reaction diagram illustrating a process of forming a non-halogenated FR HALS impact modifier from the first acryloyl-functionalized TMP monomer (depicted in FIGS. 1A, 3A, and 5A) and a second phosphorus-functionalized styrenic monomer, according to one embodiment.

FIG. 7B is a chemical reaction diagram illustrating a process of forming a non-halogenated FR HALS impact modifier from the second acryloyl-functionalized TMP monomer (depicted in FIGS. 1B, 3B, and 5B) and the second phosphorus-functionalized styrenic monomer of FIG. 7A, according to one embodiment.

FIG. 12A is a chemical reaction diagram illustrating a process of forming a non-halogenated FR HALS impact modifier from the third acryloyl-functionalized TMP monomer (depicted in FIGS. 2A, 4A, 6A, 8A, and 10A) and the fourth phosphorus-functionalized styrenic monomer of FIGS. 11A and 11B, according to one embodiment.

FIG. 12B is a chemical reaction diagram illustrating a process of forming a non-halogenated FR HALS impact modifier from the fourth acryloyl-functionalized TMP monomer (depicted in FIGS. 2B, 4B, 6B, 8B, and 10B) and the fourth phosphorus-functionalized styrenic monomer of FIGS. 11A and 11B, according to one embodiment.

FIG. 14A is a chemical reaction diagram illustrating a process of forming a non-halogenated FR HALS impact modifier from the third acryloyl-functionalized TMP monomer (depicted in FIGS. 2A, 4A, 6A, 8A, 10A, and 12A) and the fifth phosphorus-functionalized styrenic monomer of FIGS. 13A and 13B, according to one embodiment.

FIG. 14B is a chemical reaction diagram illustrating a process of forming a non-halogenated FR HALS impact modifier from the fourth acryloyl-functionalized TMP monomer (depicted in FIGS. 2B, 4B, 6B, 8B, 10B, and 12B) and the fifth phosphorus-functionalized styrenic monomer of FIGS. 13A and 13B, according to one embodiment.

FIG. 16A is a chemical reaction diagram illustrating a process of forming the second phosphorus-functionalized styrenic monomer depicted in FIGS. 7A-7B and FIGS. 8A-8B.

FIG. 16B is a chemical reaction diagram illustrating a process of forming the third phosphorus-functionalized styrenic monomer depicted in FIGS. 9A-9B and FIGS. 10A-10B.

FIG. 16C is a chemical reaction diagram illustrating a process of forming the fourth phosphorus-functionalized styrenic monomer depicted in FIGS. 11A-11B and FIGS. 12A-12B.

FIG. 16D is a chemical reaction diagram illustrating a process of forming the fifth phosphorus-functionalized styrenic monomer depicted in FIGS. 13A-13B and FIGS. 14A-14B.

DETAILED DESCRIPTION

Figure 2A:
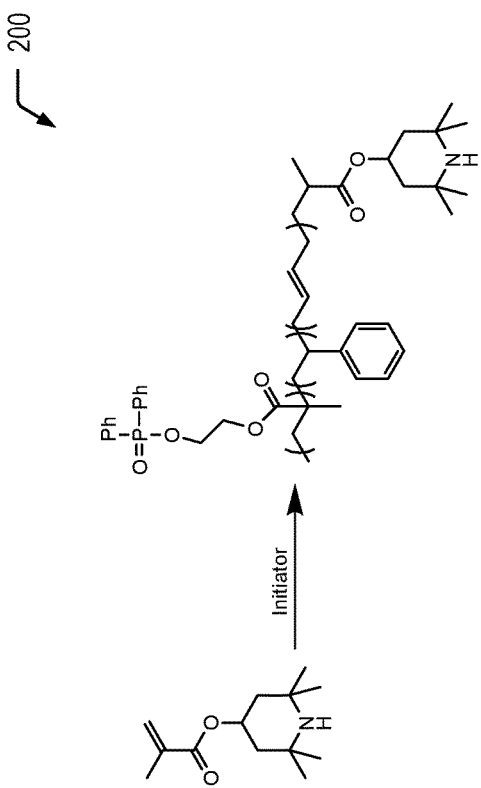
FIG. 2A is a chemical reaction diagram illustrating a process of forming a non-halogenated FR HALS impact modifier from a third acryloyl-functionalized TMP monomer and the first phosphorus-functionalized acrylate monomer of FIGS. 1A and 1B, according to one embodiment.

The present disclosure describes non-halogenated flame retardant (FR) hindered amine light stabilizer (HALS) impact modifiers and processes for forming non-halogenated FR HALS impact modifiers. The non-halogenated FR HALS impact modifiers of the present disclosure may be formed via co-polymerization of a monomer mixture that includes a non-halogenated monomer having a phosphorus-based moiety to impart flame retardant characteristics, a styrenic monomer to impart impact resistance characteristics, and a derivative of a 2,2,6,6-tetramethylpiperidine (TMP) molecule as a light stabilizer monomer to provide protection against light-induced degradation (e.g., ultraviolet (UV) degradation). By utilizing phosphorus-based materials to impart flame retardancy characteristics, the non-halogenated FR HALS impact modifiers of the present disclosure may reduce or eliminate the loss of light stabilization associated with the release of bromine radicals from conventional brominated flame retardant additives.

As described further herein, the TMP derivatives may correspond to various acryloyl-functionalized TMP monomers. An acryloyl-functionalized TMP monomer may be copolymerized (e.g., via radical polymerization) with a styrene monomer, a butadiene monomer, and a non-halogenated monomer that is functionalized with a phosphorus-based flame retardant moiety (also referred to herein as a "phosphorus-functionalized monomer"). In some cases, the phosphorus-functionalized monomer may correspond to a phosphorus-functionalized acrylate monomer. In other cases, the phosphorus-functionalized monomer may correspond to a phosphorus-functionalized styrenic monomer.

In some cases, the non-halogenated FR HALS impact modifiers of the present disclosure may be utilized as a multi-functional additive to impart flame retardancy, impact resistance, and light stabilization characteristics to a polymeric material. In other cases, after co-polymerization to form the non-halogenated FR HALS impact modifier, conversion of the piperidine amide bridge (N—H) of the TMP derivative to a nitroxyl radical (N—O.) may enable the non-halogenated FR HALS impact modifier to be bonded to a variety of polymers or polymeric blends.

As an example, FIGS. 1A-4B depict examples of co-polymerization reactions that utilize a monomer mixture that includes a phosphorus-functionalized acrylate monomer to impart flame retardancy characteristics to the resulting non-halogenated FR HALS impact modifiers. As another example, FIGS. 5A-14B depict examples of co-polymerization reactions that utilize a monomer mixture that includes a phosphorus-functionalized styrenic monomer to impart flame retardancy characteristics to the resulting non-halogenated FR HALS impact modifiers. In each case, utilizing phosphorus-based materials rather than halogenated (e.g., brominated) materials to impart flame retardancy characteristics may reduce or eliminate the loss of light stabilization associated with the release of bromine radicals from conventional brominated flame retardant additives.

FIGS. 1A-4B depict examples of co-polymerization reactions that result in the formation of various non-halogenated flame retardant HALS impact modifiers having the following general formula:

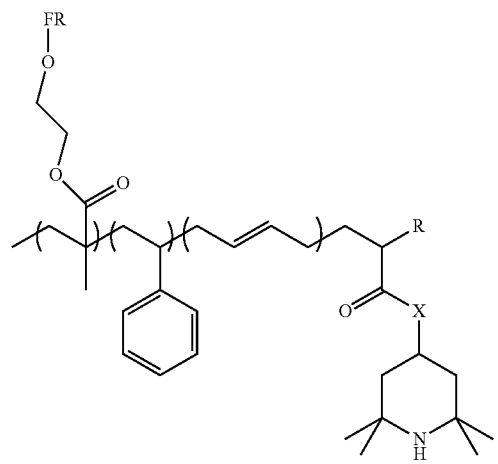

In the above formula, the letter "R" may represent H or CH₃, the letter "X" may represent O or NH, and the letters "FR" may represent a phosphorus-containing flame retardant moiety. As described further herein, the non-halogenated flame retardant HALS impact modifiers depicted above may be formed via co-polymerization of a mixture of monomers that includes a phosphorus-functionalized acrylate monomer, a styrene monomer, a butadiene monomer, and an acryloyl-functionalized TMP monomer.

In some cases, the piperidine amide bridge of the non-halogenated FR HALS impact modifiers depicted above may be converted to a nitroxyl radical, as shown below:

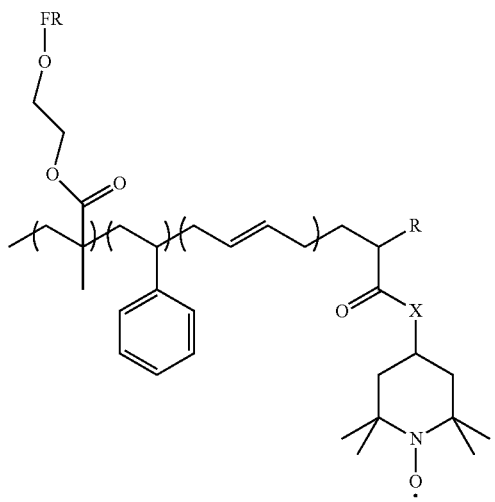

The nitroxyl radical may enable the non-halogenated FR HALS impact modifiers to be directly bonded to a variety of polymers or polymeric blends in order to form an impact resistant, flame retardant, light-stabilized polymeric material.

FIGS. 5A-14B depict examples of co-polymerization reactions that result in the formation of various non-halogenated FR HALS impact modifiers having the following general formula:

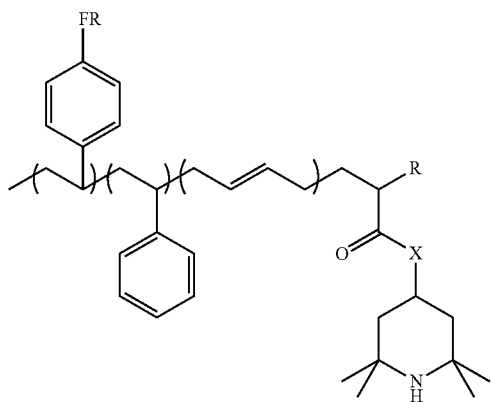

In the above formula, the letter "R" may represent H or CH$_3$, the letter "X" may represent O or NH, and the letters "FR" may represent a phosphorus-containing flame retardant moiety. As described further herein, the non-halogenated FR HALS impact modifiers depicted above may be formed via co-polymerization of a mixture of monomers that includes a phosphorus-functionalized styrenic monomer, a styrene monomer, a butadiene monomer, and an acryloyl-functionalized TMP monomer.

In some cases, the piperidine amide bridge of the non-halogenated FR HALS impact modifiers depicted above may be converted to a nitroxyl radical, as shown below:

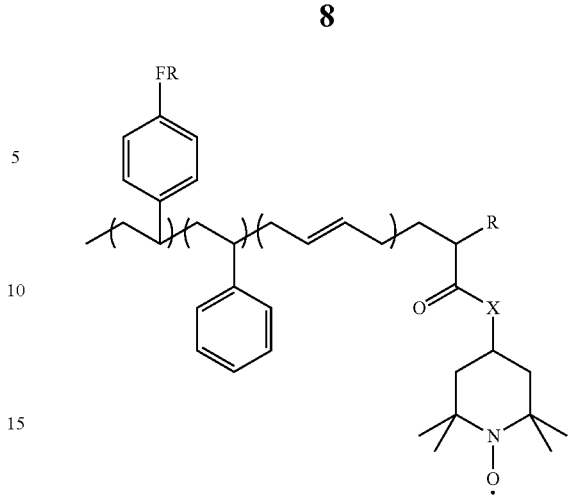

The nitroxyl radical may enable the non-halogenated FR HALS impact modifiers to be directly bonded to a variety of polymers or polymeric blends in order to form an impact resistant, flame retardant, light-stabilized polymeric material.

FIGS. 1A-1B and FIGS. 2A-2B illustrate the addition of a non-halogenated flame retardant moiety to different examples of acryloyl-functionalized TMP monomers via a co-polymerization reaction of a mixture of monomers that includes a first phosphorus-functionalized acrylate monomer. In the embodiments depicted in FIGS. 1A-1B and FIGS. 2A-2B, the phosphorus-based flame retardant moiety includes a phosphoryl group and two phenyl (Ph) groups. In alternative embodiments, one or more of the phenyl groups may be substituted by one or more alternative alkyl/aryl groups.

Referring to FIG. 1A, a chemical reaction diagram 100 illustrates a process of forming a first example of a non-halogenated FR HALS impact modifier, according to one embodiment.

The left side of the chemical reaction diagram 100 illustrates a mixture of monomers that includes a first acryloyl-functionalized TMP monomer, a styrene monomer, a butadiene monomer, and a first phosphorus-functionalized acrylate monomer. In the particular embodiment depicted in FIG. 1A, the first acryloyl-functionalized TMP monomer corresponds to N-(2,2,6,6-tetramethylpiperidin-4-yl)methacrylamide (available from Syntechem Co., Ltd.). In some cases, the first phosphorus-functionalized acrylate monomer of FIG. 1A may be formed according to the process described herein with respect to FIG. 15A.

FIG. 1A illustrates that an initiator may be utilized to initiate a radical polymerization reaction of the mixture to form the non-halogenated FR HALS impact modifier depicted on the right side of the chemical reaction diagram 100. In a particular embodiment, the polymerization reaction includes a reversible addition-fragmentation chain transfer (RAFT) polymerization reaction. It will be appreciated that other radical polymerization techniques using thermal initiators, photo-initiators, controlled radical polymerization, etc. may also be utilized to form the non-halogenated FR HALS impact modifier depicted in FIG. 1A.

While not shown in the example of FIG. 1A, in some cases, the piperidine amide bridge of the non-halogenated FR HALS impact modifier may be converted to a nitroxyl radical, as shown below:

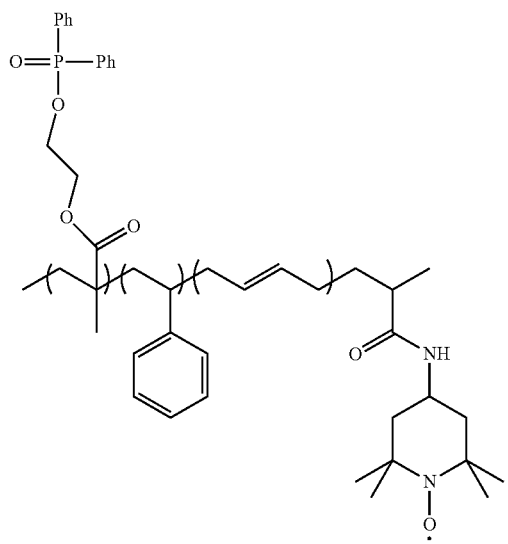

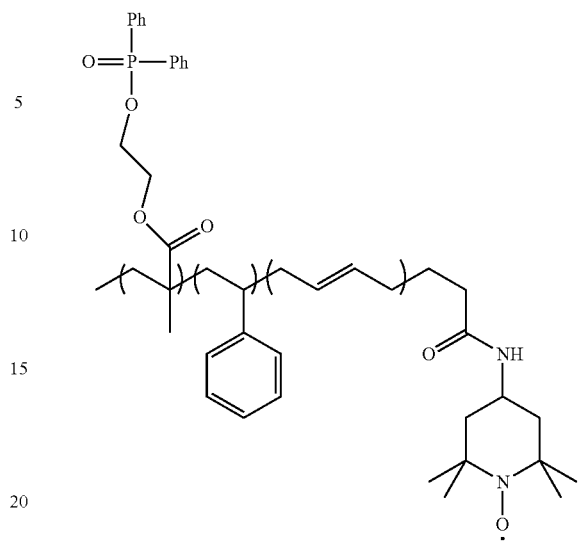

The nitroxyl radical may enable the non-halogenated FR HALS impact modifier of FIG. 1A to be bonded to a variety of polymers or polymeric blends in order to form an impact resistant, flame retardant, light-stabilized polymeric material.

Referring to FIG. 1B, a chemical reaction diagram 110 illustrates a process of forming a second example of a non-halogenated FR HALS impact modifier, according to one embodiment.

The left side of the chemical reaction diagram 110 illustrates a mixture of monomers that includes a second acryloyl-functionalized TMP monomer, a styrene monomer, a butadiene monomer, and the first phosphorus-functionalized acrylate monomer of FIG. 1A. In the particular embodiment depicted in FIG. 1B, the second acryloyl-functionalized TMP monomer corresponds to N-(2,2,6,6-tetramethylpiperidin-4-yl)acrylamide.

FIG. 1B illustrates that an initiator may be utilized to initiate a polymerization reaction of the mixture to form the non-halogenated FR HALS impact modifier depicted on the right side of the chemical reaction diagram 110. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 1B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 1B to be bonded to a variety of polymers or polymeric blends in order to form an impact resistant, flame retardant, light-stabilized polymeric material.

Referring to FIG. 2A, a chemical reaction diagram 200 illustrates a process of forming a third example of a non-halogenated FR HALS impact modifier, according to one embodiment.

The left side of the chemical reaction diagram 200 illustrates a mixture of monomers that includes a third acryloyl-functionalized TMP monomer, a styrene monomer, a butadiene monomer, and the first phosphorus-functionalized acrylate monomer (depicted in FIGS. 1A/B). In the particular embodiment depicted in FIG. 2A, the acryloyl-functionalized TMP monomer corresponds to 2,2,6,6-tetramethylpiperidin-4-yl methacrylate (available from Syntechem Co., Ltd.).

FIG. 2A illustrates that an initiator may be utilized to initiate a polymerization reaction of the mixture to form the non-halogenated FR HALS impact modifier depicted on the right side of the chemical reaction diagram 200. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 2A, in some cases, the piperidine amide bridge of the non-halogenated FR HALS impact modifier may be converted to a nitroxyl radical, as shown below:

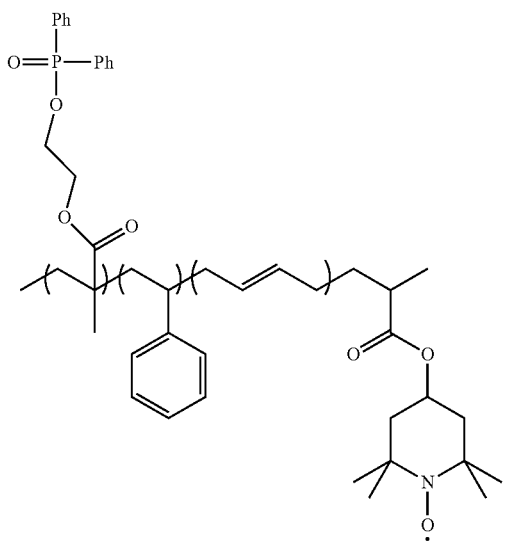
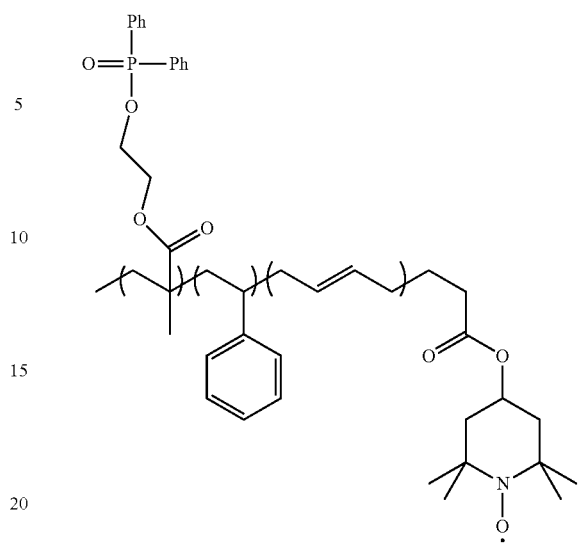

The nitroxyl radical may enable the non-halogenated FR HALS impact modifier of FIG. 2A to be bonded to a variety of polymers or polymeric blends in order to form an impact resistant, flame retardant, light-stabilized polymeric material.

Figure 2B:
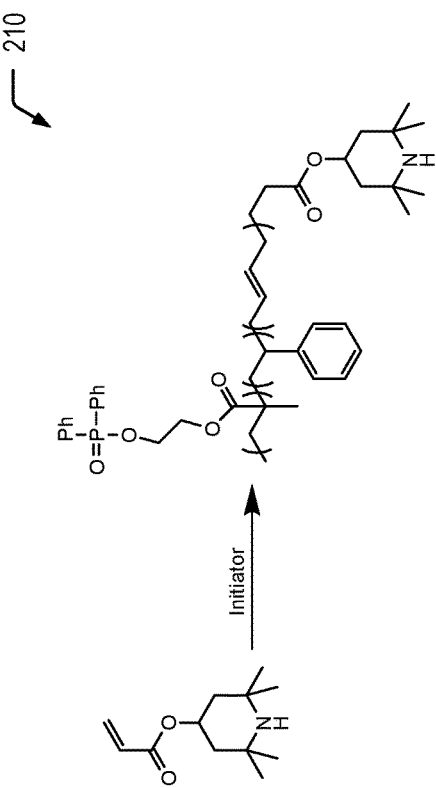
FIG. 2B is a chemical reaction diagram illustrating a process of forming a non-halogenated FR HALS impact modifier from a fourth acryloyl-functionalized TMP monomer the first phosphorus-functionalized acrylate monomer of FIGS. 1A and 1B, according to one embodiment.

Referring to FIG. 2B, a chemical reaction diagram 210 illustrates a process of forming a fourth example of a non-halogenated FR HALS impact modifier, according to one embodiment.

The left side of the chemical reaction diagram 210 illustrates a mixture of monomers that includes a fourth acryloyl-functionalized TMP monomer, a styrene monomer, a butadiene monomer, and the first phosphorus-functionalized acrylate monomer of FIGS. 1A/B and 2A. In the particular embodiment depicted in FIG. 2B, the acryloyl-functionalized TMP monomer corresponds to 2,2,6,6-tetramethylpiperidin-4-yl acrylate.

FIG. 2B illustrates that an initiator may be utilized to initiate a polymerization reaction of the mixture to form the non-halogenated FR HALS impact modifier depicted on the right side of the chemical reaction diagram 210. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 2B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 2B to be bonded to a variety of polymers or polymeric blends in order to form an impact resistant, flame retardant, light-stabilized polymeric material.

FIGS. 3A-3B and FIG. 4A-4B illustrate the addition of a non-halogenated flame retardant moiety to different examples of acryloyl-functionalized TMP monomers via a co-polymerization reaction of a mixture of monomers that includes a second phosphorus-functionalized acrylate monomer. In the particular embodiment depicted in FIGS. 3A-3B and FIGS. 4A-4B, the phosphorus-based flame retardant moiety includes a phosphoryl group and two phenoxy (OPh) groups. In alternative embodiments, one or more of the phenoxy groups may be substituted by one or more alternative groups, such as alkoxy (OR) groups.

Figure 3A:
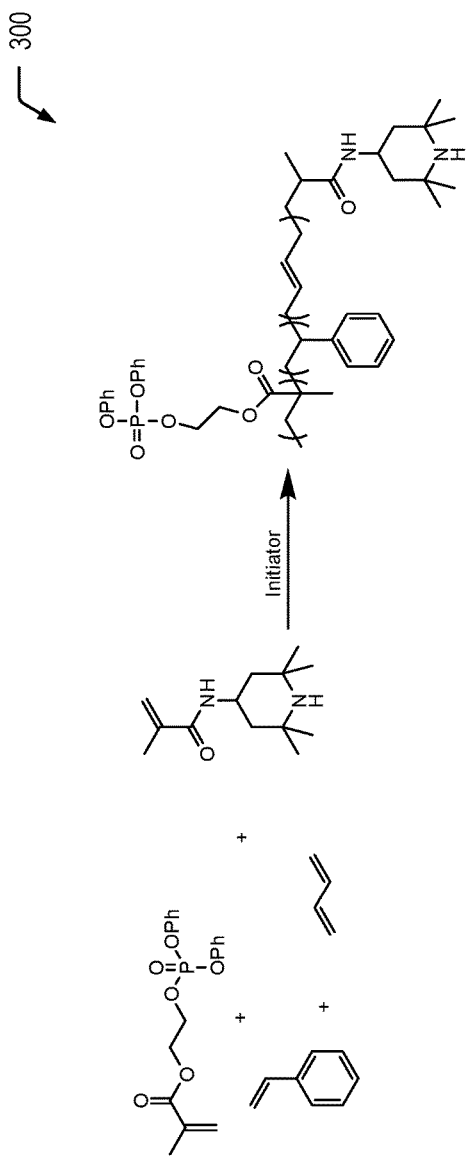
FIG. 3A is a chemical reaction diagram illustrating a process of forming a non-halogenated FR HALS impact modifier from the first acryloyl-functionalized TMP monomer of FIG. 1A and a second phosphorus-functionalized acrylate monomer, according to one embodiment.

Referring to FIG. 3A, a chemical reaction diagram 300 illustrates a process of forming a fifth example of a non-halogenated FR HALS impact modifier, according to one embodiment.

The left side of the chemical reaction diagram 300 illustrates a mixture of monomers that includes the first acryloyl-functionalized TMP monomer depicted in FIG. 1A (i.e., N-(2,2,6,6-tetramethylpiperidin-4-yl)methacrylamide), a styrene monomer, a butadiene monomer, and the second phosphorus-functionalized acrylate monomer. In some cases, the second phosphorus-functionalized acrylate monomer of FIG. 3A may be formed according to the process described herein with respect to FIG. 15B.

FIG. 3A illustrates that an initiator may be utilized to initiate a polymerization reaction of the mixture to form the non-halogenated FR HALS impact modifier depicted on the right side of the chemical reaction diagram 300. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 3A, in some cases, the piperidine amide bridge of the non-halogenated FR HALS impact modifier may be converted to a nitroxyl radical, as shown below:

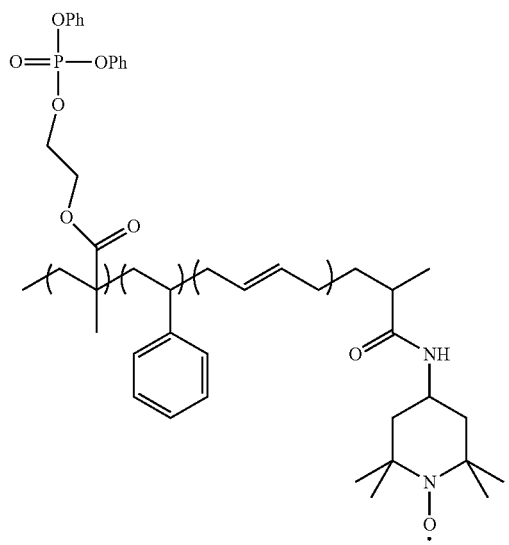

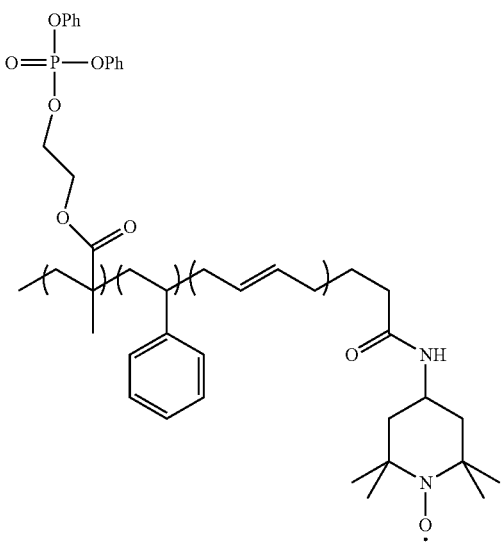

The nitroxyl radical may enable the non-halogenated FR HALS impact modifier of FIG. 3A to be bonded to a variety of polymers or polymeric blends in order to form an impact resistant, flame retardant, light-stabilized polymeric material.

Figure 3B:
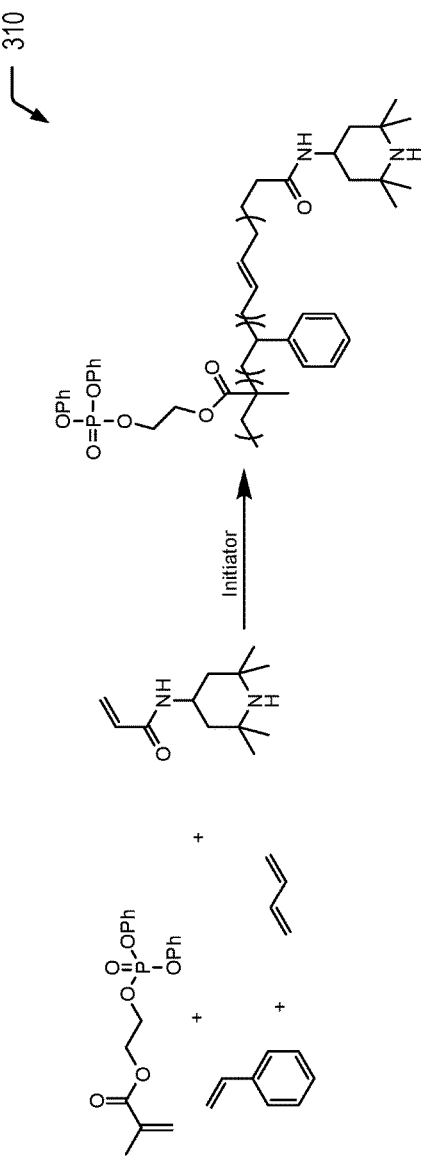
FIG. 3B is a chemical reaction diagram illustrating a process of forming a non-halogenated FR HALS impact modifier from the second acryloyl-functionalized TMP monomer of FIG. 1B and the second phosphorus-functionalized acrylate monomer of FIG. 3A, according to one embodiment.

Referring to FIG. 3B, a chemical reaction diagram 310 illustrates a process of forming a sixth example of a non-halogenated FR HALS impact modifier, according to one embodiment.

The left side of the chemical reaction diagram 310 illustrates a mixture of monomers that includes the second acryloyl-functionalized TMP monomer depicted in FIG. 1B (i.e., N-(2,2,6,6-tetramethylpiperidin-4-yl)acrylamide), a styrene monomer, a butadiene monomer, and the second phosphorus-functionalized acrylate monomer of FIG. 3A.

FIG. 3B illustrates that an initiator may be utilized to initiate a polymerization reaction of the mixture to form the non-halogenated FR HALS impact modifier depicted on the right side of the chemical reaction diagram 310. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 3B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 3B to be bonded to a variety of polymers or polymeric blends in order to form an impact resistant, flame retardant, light-stabilized polymeric material.

Referring to FIG. 4A, a chemical reaction diagram 400 illustrates a process of forming a seventh example of a non-halogenated FR HALS impact modifier, according to one embodiment.

The left side of the chemical reaction diagram 400 illustrates a mixture of monomers that includes the third acryloyl-functionalized TMP monomer depicted in FIG. 2A (i.e., 2,2,6,6-tetramethylpiperidin-4-yl methacrylate), a styrene monomer, a butadiene monomer, and the second phosphorus-functionalized acrylate monomer of FIGS. 3A-3B.

FIG. 4A illustrates that an initiator may be utilized to initiate a polymerization reaction of the mixture to form the non-halogenated FR HALS impact modifier depicted on the right side of the chemical reaction diagram 400. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 4A, in some cases, the piperidine amide bridge of the non-halogenated FR HALS impact modifier may be converted to a nitroxyl radical, as shown below:

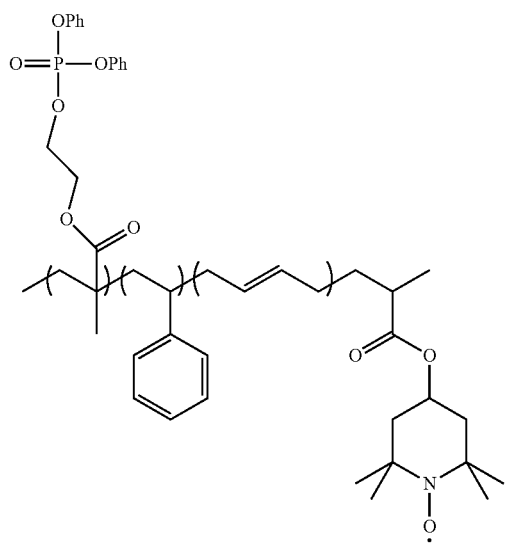

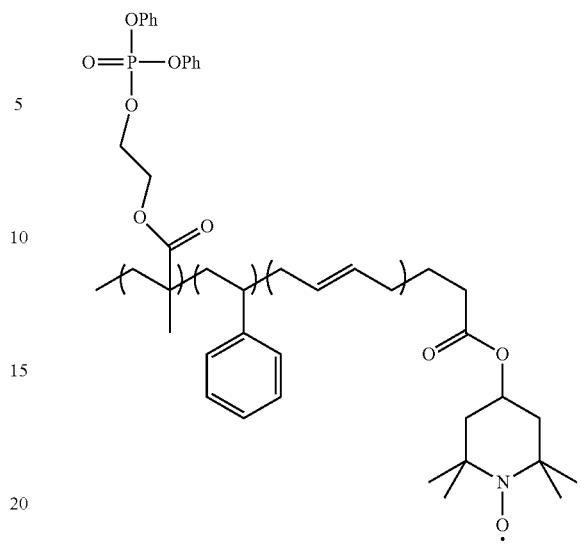

The nitroxyl radical may enable the non-halogenated FR HALS impact modifier of FIG. 4A to be bonded to a variety of polymers or polymeric blends in order to form an impact resistant, flame retardant, light-stabilized polymeric material.

Referring to FIG. 4B, a chemical reaction diagram 410 illustrates a process of forming an eighth example of a non-halogenated FR HALS impact modifier, according to one embodiment.

The left side of the chemical reaction diagram 410 illustrates a mixture of monomers that includes the fourth acryloyl-functionalized TMP monomer depicted in FIG. 2B (i.e., 2,2,6,6-tetramethylpiperidin-4-yl acrylate), a styrene monomer, a butadiene monomer, and the second phosphorus-functionalized acrylate monomer of FIGS. 3A/B and 4A.

FIG. 4B illustrates that an initiator may be utilized to initiate a polymerization reaction of the mixture to form the non-halogenated FR HALS impact modifier depicted on the right side of the chemical reaction diagram 410. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 4B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 4B to be bonded to a variety of polymers or polymeric blends in order to form an impact resistant, flame retardant, light-stabilized polymeric material.

FIGS. 5A-5B and FIGS. 6A-6B illustrate the addition of a non-halogenated flame retardant moiety to different examples of acryloyl-functionalized TMP monomers via a co-polymerization reaction of a mixture of monomers that includes a first phosphorus-functionalized styrenic monomer. In the embodiments depicted in FIGS. 5A-5B and FIGS. 6A-6B, the phosphorus-based flame retardant moiety includes two phenyl (Ph) groups. In alternative embodiments, one or more of the phenyl groups may be substituted by one or more alternative alkyl/aryl groups.

Referring to FIG. 5A, a chemical reaction diagram 500 illustrates a process of forming a ninth example of a non-halogenated FR HALS impact modifier, according to one embodiment.

The left side of the chemical reaction diagram 500 illustrates a mixture of monomers that includes the first acryloyl-functionalized TMP monomer (i.e., N-(2,2,6,6-tetramethyl-piperidin-4-yl)methacrylamide), a styrene monomer, a butadiene monomer, and a first phosphorus-functionalized styrenic monomer (diphenyl styrenyl phosphine).

FIG. 5A illustrates that an initiator may be utilized to initiate a polymerization reaction of the mixture to form the non-halogenated FR HALS impact modifier depicted on the right side of the chemical reaction diagram 500. In a particular embodiment, the polymerization reaction includes a RAFT polymerization reaction. It will be appreciated that other radical polymerization techniques using thermal initiators, photo-initiators, controlled radical polymerization, etc. may also be utilized While not shown in the example of FIG. 5A, in some cases, the piperidine amide bridge of the non-halogenated FR HALS impact modifier may be converted to a nitroxyl radical, as shown below:

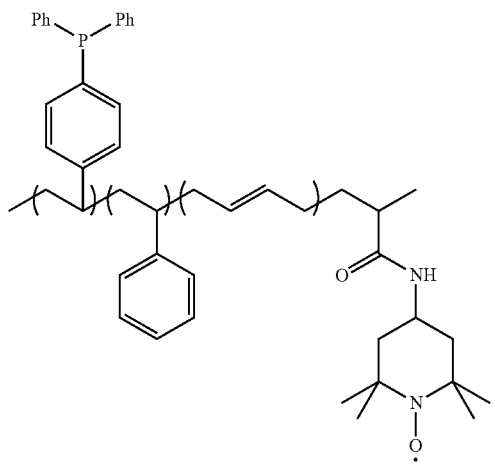

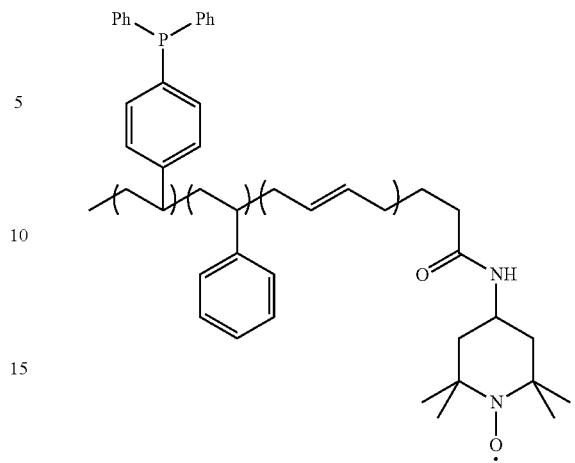

The nitroxyl radical may enable the non-halogenated FR HALS impact modifier of FIG. 5A to be bonded to a variety of polymers or polymeric blends in order to form an impact resistant, flame retardant, light-stabilized polymeric material.

Referring to FIG. 5B, a chemical reaction diagram 510 illustrates a process of forming a tenth examples of a non-halogenated FR HALS impact modifier, according to one embodiment.

The left side of the chemical reaction diagram 510 illustrates a mixture of monomers that includes the second acryloyl-functionalized TMP monomer (i.e., N-(2,2,6,6-tetramethylpiperidin-4-yl)acrylamide), a styrene monomer, a butadiene monomer, and the first phosphorus-functionalized styrenic monomer of FIG. 5A.

FIG. 5B illustrates that an initiator may be utilized to initiate a polymerization reaction of the mixture to form the non-halogenated FR HALS impact modifier depicted on the right side of the chemical reaction diagram 510. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 5B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 5B to be bonded to a variety of polymers or polymeric blends in order to form an impact resistant, flame retardant, light-stabilized polymeric material.

Figure 6A:
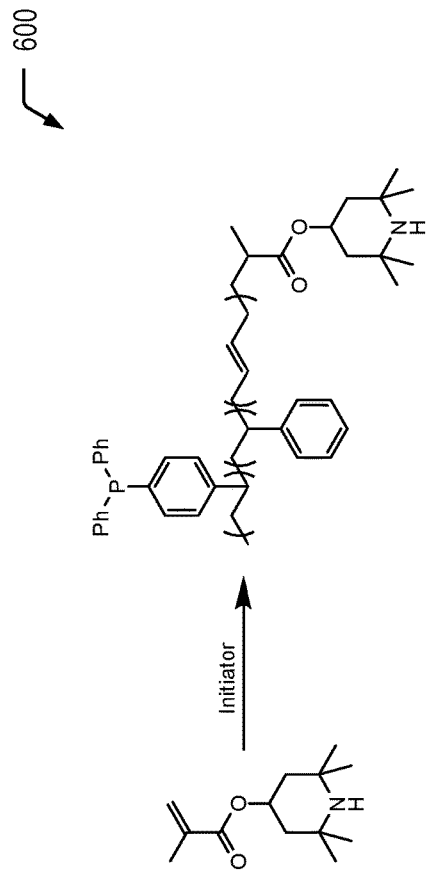
FIG. 6A is a chemical reaction diagram illustrating a process of forming a non-halogenated FR HALS impact modifier from the third acryloyl-functionalized TMP monomer (depicted in FIGS. 2A and 4A) and the first phosphorus-functionalized styrenic monomer of FIGS. 5A and 5B, according to one embodiment.

Referring to FIG. 6A, a chemical reaction diagram 600 illustrates a process of forming another example of a non-halogenated FR HALS impact modifier, according to one embodiment.

The left side of the chemical reaction diagram 600 illustrates a mixture of monomers that includes the third acryloyl-functionalized TMP monomer (i.e., 2,2,6,6-tetramethylpiperidin-4-yl methacrylate), a styrene monomer, a butadiene monomer, and the first phosphorus-functionalized styrenic monomer of FIGS. 5A/B.

FIG. 6A illustrates that an initiator may be utilized to initiate a polymerization reaction of the mixture to form the non-halogenated FR HALS impact modifier depicted on the right side of the chemical reaction diagram 600. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 6A, in some cases, the piperidine amide bridge of the non-halogenated FR HALS impact modifier may be converted to a nitroxyl radical, as shown below:

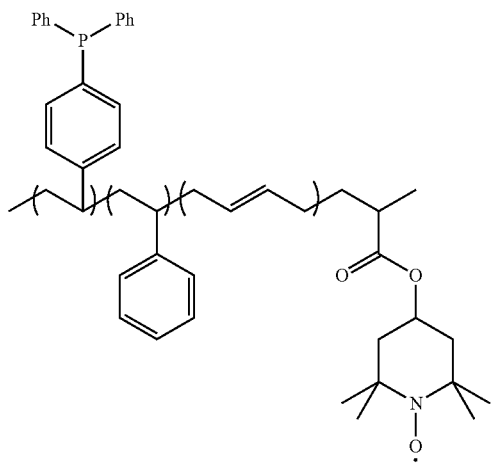
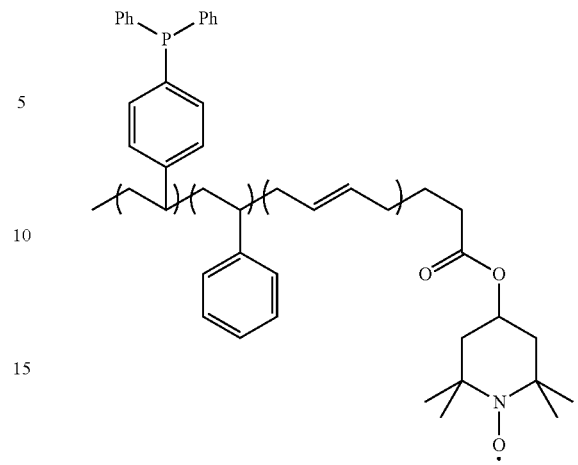

The nitroxyl radical may enable the non-halogenated FR HALS impact modifier of FIG. 6A to be bonded to a variety of polymers or polymeric blends in order to form an impact resistant, flame retardant, light-stabilized polymeric material.

Figure 6B:
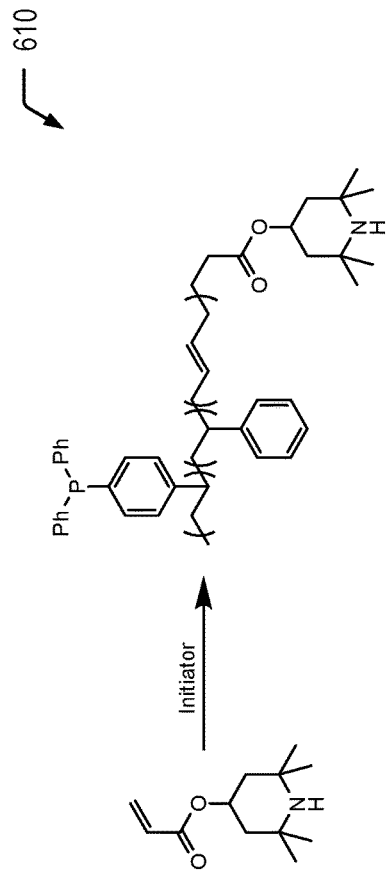
FIG. 6B is a chemical reaction diagram illustrating a process of forming a non-halogenated FR HALS impact modifier from the fourth acryloyl-functionalized TMP monomer (depicted in FIGS. 2B and 4B) and the first phosphorus-functionalized styrenic monomer of FIGS. 5A and 5B, according to one embodiment.

Referring to FIG. 6B, a chemical reaction diagram 610 illustrates a process of forming a twelfth example of a non-halogenated FR HALS impact modifier, according to one embodiment.

The left side of the chemical reaction diagram 610 illustrates a mixture of monomers that includes the fourth acryloyl-functionalized TMP monomer (i.e., 2,2,6,6-tetramethylpiperidin-4-yl acrylate), a styrene monomer, a butadiene monomer, and the first phosphorus-functionalized styrenic monomer of FIGS. 5A/B and 6A.

FIG. 6B illustrates that an initiator may be utilized to initiate a polymerization reaction of the mixture to form the non-halogenated FR HALS impact modifier depicted on the right side of the chemical reaction diagram 610. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 6B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 6B to be bonded to a variety of polymers or polymeric blends in order to form an impact resistant, flame retardant, light-stabilized polymeric material.

Referring to FIG. 7A, a chemical reaction diagram 700 illustrates a process of forming another example of a non-halogenated FR HALS impact modifier, according to one embodiment.

The left side of the chemical reaction diagram 700 illustrates a mixture of monomers that includes the first acryloyl-functionalized TMP monomer (i.e., N-(2,2,6,6-tetramethylpiperidin-4-yl)methacrylamide), a styrene monomer, a butadiene monomer, and a second phosphorus-functionalized styrenic monomer. In some cases, the second phosphorus-functionalized styrenic monomer of FIG. 7A may be formed from the first phosphorus-functionalized styrenic monomer (diphenyl styrenyl phosphine) according to the process described herein with respect to FIG. 16A.

FIG. 7A illustrates that an initiator may be utilized to initiate a polymerization reaction of the mixture to form the non-halogenated FR HALS impact modifier depicted on the right side of the chemical reaction diagram 700. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 7A, in some cases, the piperidine amide bridge of the non-halogenated FR HALS impact modifier may be converted to a nitroxyl radical, as shown below:

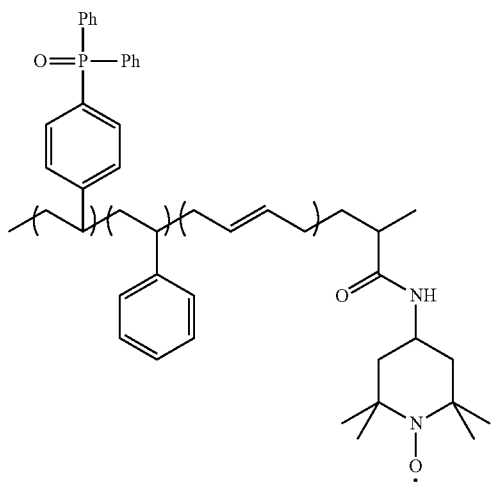
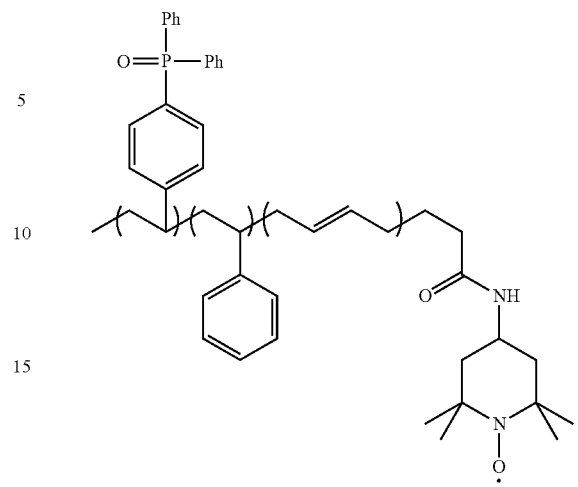

The nitroxyl radical may enable the non-halogenated FR HALS impact modifier of FIG. 7A to be bonded to a variety of polymers or polymeric blends in order to form an impact resistant, flame retardant, light-stabilized polymeric material.

Referring to FIG. 7B, a chemical reaction diagram 710 illustrates a process of forming another example of a non-halogenated FR HALS impact modifier, according to one embodiment.

The left side of the chemical reaction diagram 710 illustrates a mixture of monomers that includes the second acryloyl-functionalized TMP monomer (i.e., N-(2,2,6,6-tetramethylpiperidin-4-yl)acrylamide), a styrene monomer, a butadiene monomer, and the second phosphorus-functionalized styrenic monomer of FIG. 7A.

FIG. 7B illustrates that an initiator may be utilized to initiate a polymerization reaction of the mixture to form the non-halogenated FR HALS impact modifier depicted on the right side of the chemical reaction diagram 710. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 7B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 7B to be bonded to a variety of polymers or polymeric blends in order to form an impact resistant, flame retardant, light-stabilized polymeric material.

Figure 8A:
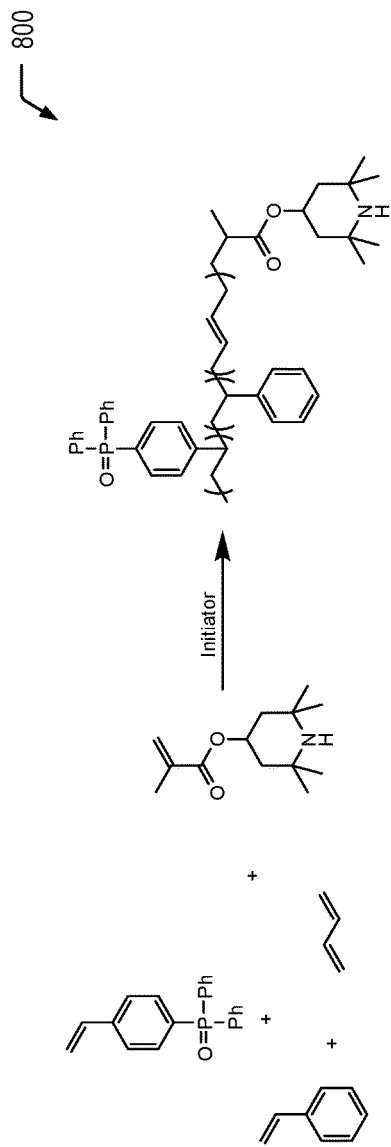
FIG. 8A is a chemical reaction diagram illustrating a process of forming a non-halogenated FR HALS impact modifier from the third acryloyl-functionalized TMP monomer (depicted in FIGS. 2A, 4A, and 6A) and the second phosphorus-functionalized styrenic monomer of FIGS. 7A and 7B, according to one embodiment.

Referring to FIG. 8A, a chemical reaction diagram 800 illustrates a process of forming another example of a non-halogenated FR HALS impact modifier, according to one embodiment.

The left side of the chemical reaction diagram 800 illustrates a mixture of monomers that includes the third acryloyl-functionalized TMP monomer (i.e., 2,2,6,6-tetramethylpiperidin-4-yl methacrylate), a styrene monomer, a butadiene monomer, and the second phosphorus-functionalized styrenic monomer of FIGS. 7A/B.

FIG. 8A illustrates that an initiator may be utilized to initiate a polymerization reaction of the mixture to form the non-halogenated FR HALS impact modifier depicted on the right side of the chemical reaction diagram 800. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 8A, in some cases, the piperidine amide bridge of the non-halogenated FR HALS impact modifier may be converted to a nitroxyl radical, as shown below:

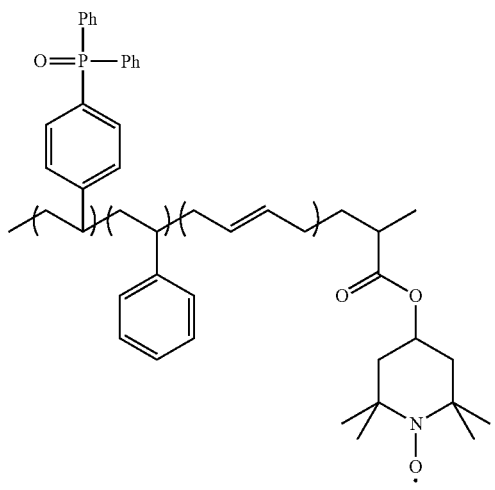

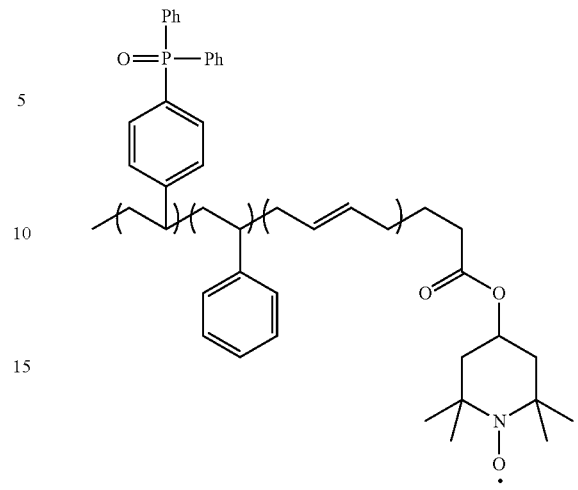

The nitroxyl radical may enable the non-halogenated FR HALS impact modifier of FIG. 8A to be bonded to a variety of polymers or polymeric blends in order to form an impact resistant, flame retardant, light-stabilized polymeric material.

Figure 8B:
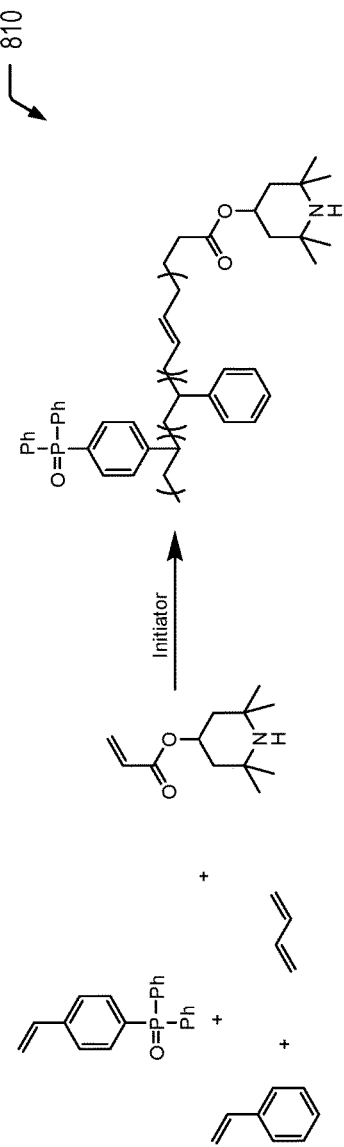
FIG. 8B is a chemical reaction diagram illustrating a process of forming a non-halogenated FR HALS impact modifier from the fourth acryloyl-functionalized TMP monomer (depicted in FIGS. 2B, 4B, and 6B) and the second phosphorus-functionalized styrenic monomer of FIGS. 7A and 7B, according to one embodiment.

Referring to FIG. 8B, a chemical reaction diagram 810 illustrates a process of forming another example of a non-halogenated FR HALS impact modifier, according to one embodiment.

The left side of the chemical reaction diagram 810 illustrates a mixture of monomers that includes the fourth acryloyl-functionalized TMP monomer (i.e., 2,2,6,6-tetramethylpiperidin-4-yl acrylate), a styrene monomer, a butadiene monomer, and the second phosphorus-functionalized styrenic monomer of FIGS. 7A/B and 8A.

FIG. 8B illustrates that an initiator may be utilized to initiate a polymerization reaction of the mixture to form the non-halogenated FR HALS impact modifier depicted on the right side of the chemical reaction diagram 810. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 8B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 8B to be bonded to a variety of polymers or polymeric blends in order to form an impact resistant, flame retardant, light-stabilized polymeric material.

Figure 9A:
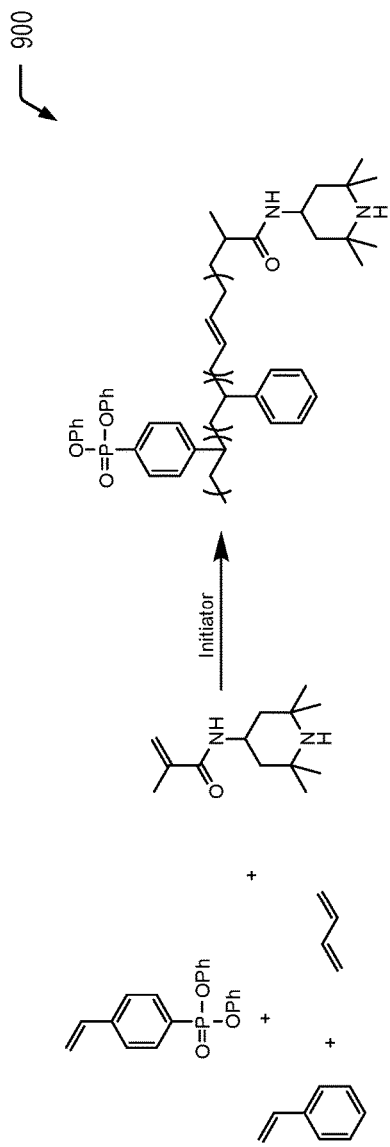
FIG. 9A is a chemical reaction diagram illustrating a process of forming a non-halogenated FR HALS impact modifier from the first acryloyl-functionalized TMP monomer (depicted in FIGS. 1A, 3A, 5A, and 7A) and a third phosphorus-functionalized styrenic monomer, according to one embodiment.

Referring to FIG. 9A, a chemical reaction diagram 900 illustrates a process of forming another example of a non-halogenated FR HALS impact modifier, according to one embodiment.

The left side of the chemical reaction diagram 900 illustrates a mixture of monomers that includes the first acryloyl-functionalized TMP monomer (i.e., N-(2,2,6,6-tetramethylpiperidin-4-yl)methacrylamide), a styrene monomer, a butadiene monomer, and a third phosphorus-functionalized styrenic monomer. In some cases, the third phosphorus-functionalized styrenic monomer of FIG. 9A may be formed according to the process described herein with respect to FIG. 16B.

FIG. 9A illustrates that an initiator may be utilized to initiate a polymerization reaction of the mixture to form the non-halogenated FR HALS impact modifier depicted on the right side of the chemical reaction diagram 900. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 9A, in some cases, the piperidine amide bridge of the non-halogenated FR HALS impact modifier may be converted to a nitroxyl radical, as shown below:

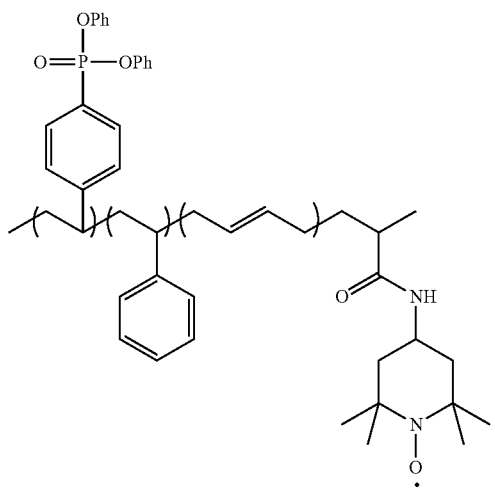

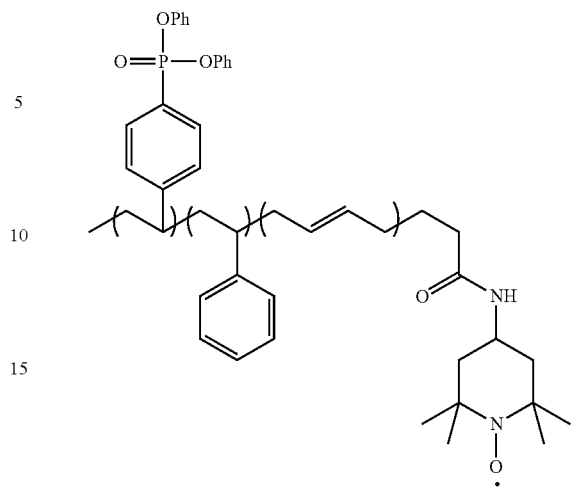

The nitroxyl radical may enable the non-halogenated FR HALS impact modifier of FIG. 9A to be bonded to a variety of polymers or polymeric blends in order to form an impact resistant, flame retardant, light-stabilized polymeric material.

Figure 9B:
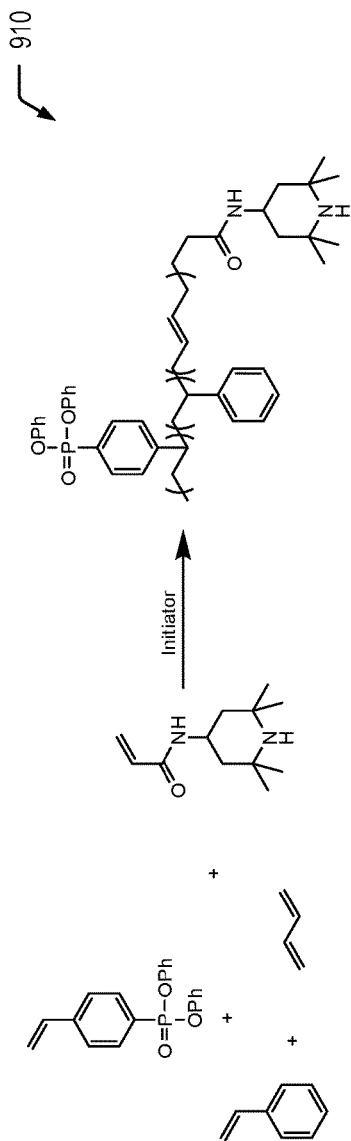
FIG. 9B is a chemical reaction diagram illustrating a process of forming a non-halogenated FR HALS impact modifier from the second acryloyl-functionalized TMP monomer (depicted in FIGS. 1B, 3B, 5B, and 7B) and the third phosphorus-functionalized styrenic monomer of FIG. 9A, according to one embodiment.

Referring to FIG. 9B, a chemical reaction diagram 910 illustrates a process of forming another example of a non-halogenated FR HALS impact modifier, according to one embodiment.

The left side of the chemical reaction diagram 910 illustrates a mixture of monomers that includes the second acryloyl-functionalized TMP monomer (i.e., N-(2,2,6,6-tetramethylpiperidin-4-yl)acrylamide), a styrene monomer, a butadiene monomer, and the third phosphorus-functionalized styrenic monomer of FIG. 9A.

FIG. 9B illustrates that an initiator may be utilized to initiate a polymerization reaction of the mixture to form the non-halogenated FR HALS impact modifier depicted on the right side of the chemical reaction diagram 910. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 9B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 9B to be bonded to a variety of polymers or polymeric blends in order to form an impact resistant, flame retardant, light-stabilized polymeric material.

Figure 10A:
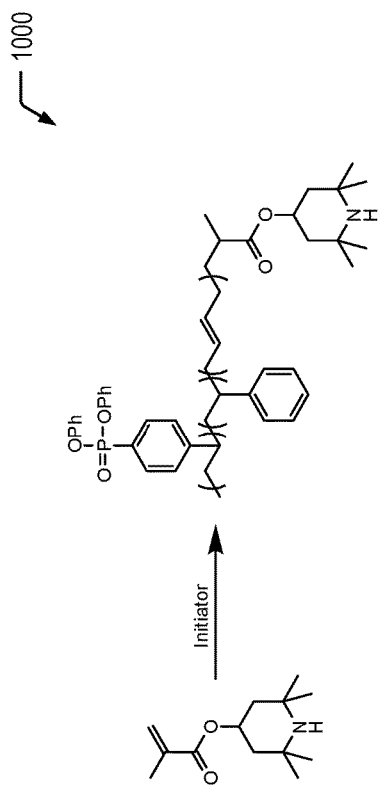
FIG. 10A is a chemical reaction diagram illustrating a process of forming a non-halogenated FR HALS impact modifier from the third acryloyl-functionalized TMP monomer (depicted in FIGS. 2A, 4A, 6A, and 8A) and the third phosphorus-functionalized styrenic monomer of FIGS. 9A and 9B, according to one embodiment.

Referring to FIG. 10A, a chemical reaction diagram 1000 illustrates a process of forming another example of a non-halogenated FR HALS impact modifier, according to one embodiment.

The left side of the chemical reaction diagram 1000 illustrates a mixture of monomers that includes the third acryloyl-functionalized TMP monomer (i.e., 2,2,6,6-tetramethylpiperidin-4-yl methacrylate), a styrene monomer, a butadiene monomer, and the third phosphorus-functionalized styrenic monomer of FIGS. 9A/B.

FIG. 10A illustrates that an initiator may be utilized to initiate a polymerization reaction of the mixture to form the non-halogenated FR HALS impact modifier depicted on the right side of the chemical reaction diagram 1000. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 10A, in some cases, the piperidine amide bridge of the non-halogenated FR HALS impact modifier may be converted to a nitroxyl radical, as shown below:

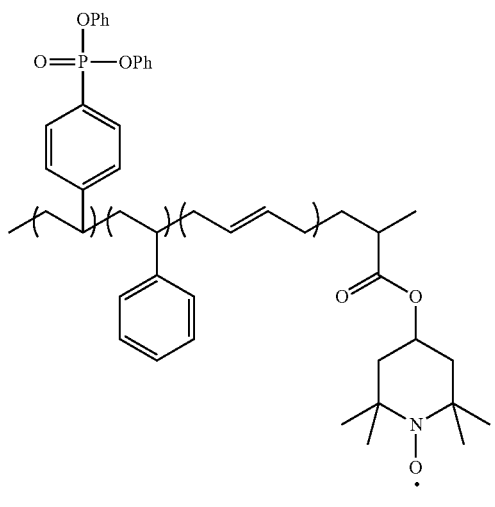

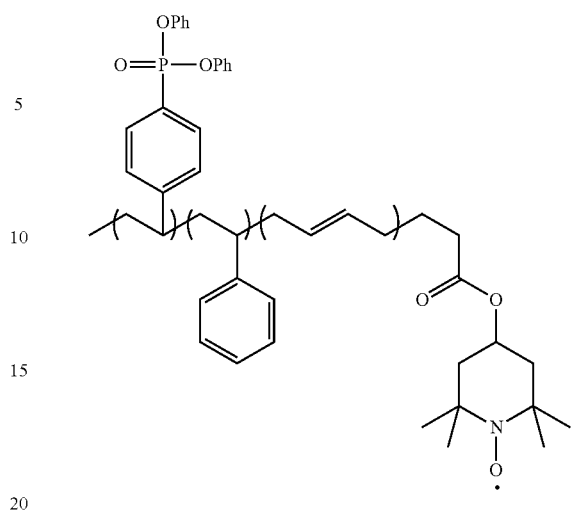

The nitroxyl radical may enable the non-halogenated FR HALS impact modifier of FIG. 10A to be bonded to a variety of polymers or polymeric blends in order to form an impact resistant, flame retardant, light-stabilized polymeric material.

Figure 10B:
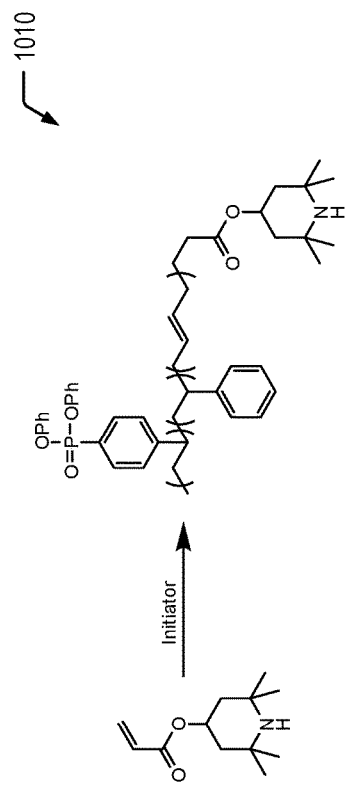
FIG. 10B is a chemical reaction diagram illustrating a process of forming a non-halogenated FR HALS impact modifier from the fourth acryloyl-functionalized TMP monomer (depicted in FIGS. 2B, 4B, 6B, and 8B) and the third phosphorus-functionalized styrenic monomer of FIGS. 9A and 9B, according to one embodiment.

Referring to FIG. 10B, a chemical reaction diagram 1010 illustrates a process of forming another example of a non-halogenated FR HALS impact modifier, according to one embodiment.

The left side of the chemical reaction diagram 1010 illustrates a mixture of monomers that includes the fourth acryloyl-functionalized TMP monomer (i.e., 2,2,6,6-tetramethylpiperidin-4-yl acrylate), a styrene monomer, a butadiene monomer, and the third phosphorus-functionalized styrenic monomer of FIGS. 9A/B and 10A.

FIG. 10B illustrates that an initiator may be utilized to initiate a polymerization reaction of the mixture to form the non-halogenated FR HALS impact modifier depicted on the right side of the chemical reaction diagram 1010. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 10B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 10B to be bonded to a variety of polymers or polymeric blends in order to form an impact resistant, flame retardant, light-stabilized polymeric material.

Figure 11A:
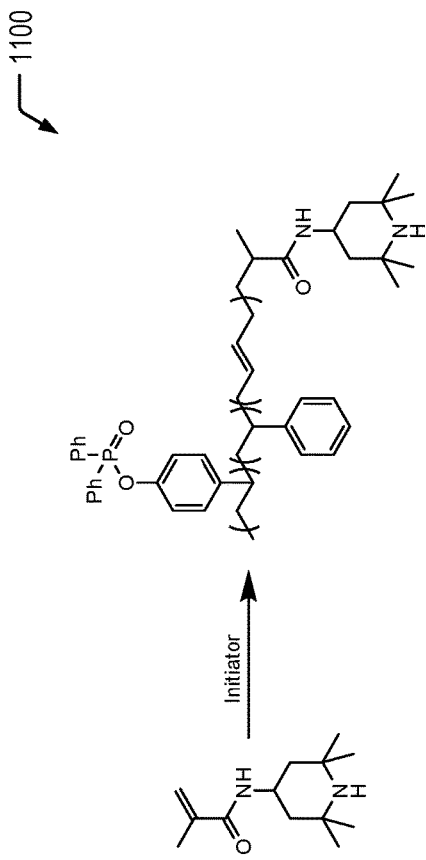
FIG. 11A is a chemical reaction diagram illustrating a process of forming a non-halogenated FR HALS impact modifier from the first acryloyl-functionalized TMP monomer (depicted in FIGS. 1A, 3A, 5A, 7A, and 9A) and a fourth phosphorus-functionalized styrenic monomer, according to one embodiment.

Referring to FIG. 11A, a chemical reaction diagram 1100 illustrates a process of forming another example of a non-halogenated FR HALS impact modifier, according to one embodiment.

The left side of the chemical reaction diagram 1100 illustrates a mixture of monomers that includes the first acryloyl-functionalized TMP monomer (i.e., N-(2,2,6,6-tetramethylpiperidin-4-yl)methacrylamide), a styrene monomer, a butadiene monomer, and a fourth phosphorus-functionalized styrenic monomer. In some cases, the fourth phosphorus-functionalized styrenic monomer of FIG. 11A may be formed according to the process described herein with respect to FIG. 16C.

FIG. 11A illustrates that an initiator may be utilized to initiate a polymerization reaction of the mixture to form the non-halogenated FR HALS impact modifier depicted on the right side of the chemical reaction diagram 1100. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 11A, in some cases, the piperidine amide bridge of the non-halogenated FR HALS impact modifier may be converted to a nitroxyl radical, as shown below:

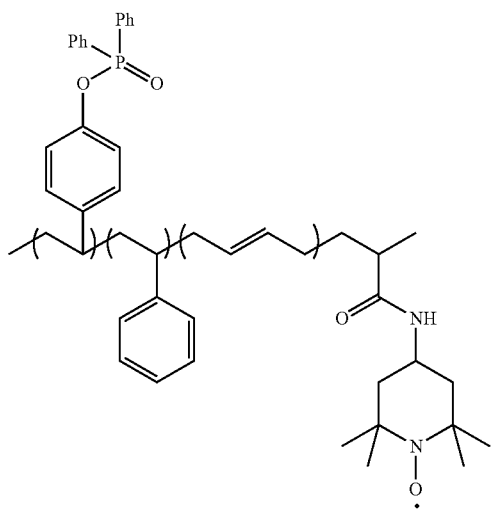

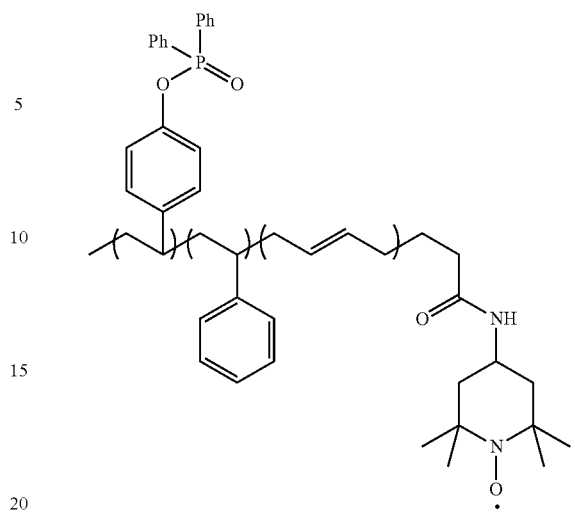

The nitroxyl radical may enable the non-halogenated FR HALS impact modifier of FIG. 11A to be bonded to a variety of polymers or polymeric blends in order to form an impact resistant, flame retardant, light-stabilized polymeric material.

Figure 11B:
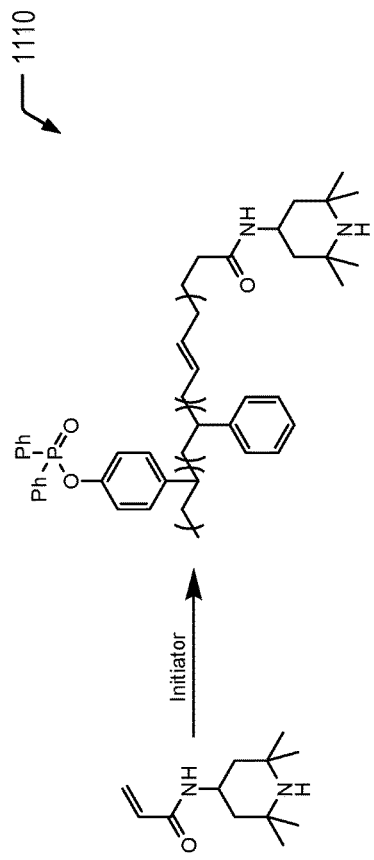
FIG. 11B is a chemical reaction diagram illustrating a process of forming a non-halogenated FR HALS impact modifier from the second acryloyl-functionalized TMP monomer (depicted in FIGS. 1B, 3B, 5B, 7B, and 9B) and the fourth phosphorus-functionalized styrenic monomer of FIG. 11A, according to one embodiment.

Referring to FIG. 11B, a chemical reaction diagram 1110 illustrates a process of forming another example of a non-halogenated FR HALS impact modifier, according to one embodiment.

The left side of the chemical reaction diagram 1110 illustrates a mixture of monomers that includes the second acryloyl-functionalized TMP monomer (i.e., N-(2,2,6,6-tetramethylpiperidin-4-yl)acrylamide), a styrene monomer, a butadiene monomer, and the fourth phosphorus-functionalized styrenic monomer of FIG. 11A.

FIG. 11B illustrates that an initiator may be utilized to initiate a polymerization reaction of the mixture to form the non-halogenated FR HALS impact modifier depicted on the right side of the chemical reaction diagram 1110. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 11B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 11B to be bonded to a variety of polymers or polymeric blends in order to form an impact resistant, flame retardant, light-stabilized polymeric material.

Referring to FIG. 12A, a chemical reaction diagram 1200 illustrates a process of forming another example of a non-halogenated FR HALS impact modifier, according to one embodiment.

The left side of the chemical reaction diagram 1200 illustrates a mixture of monomers that includes the third acryloyl-functionalized TMP monomer (i.e., 2,2,6,6-tetramethylpiperidin-4-yl methacrylate), a styrene monomer, a butadiene monomer, and the fourth phosphorus-functionalized styrenic monomer of FIGS. 11A/B.

FIG. 12A illustrates that an initiator may be utilized to initiate a polymerization reaction of the mixture to form the non-halogenated FR HALS impact modifier depicted on the right side of the chemical reaction diagram 1200. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 12A, in some cases, the piperidine amide bridge of the non-halogenated FR HALS impact modifier may be converted to a nitroxyl radical, as shown below:

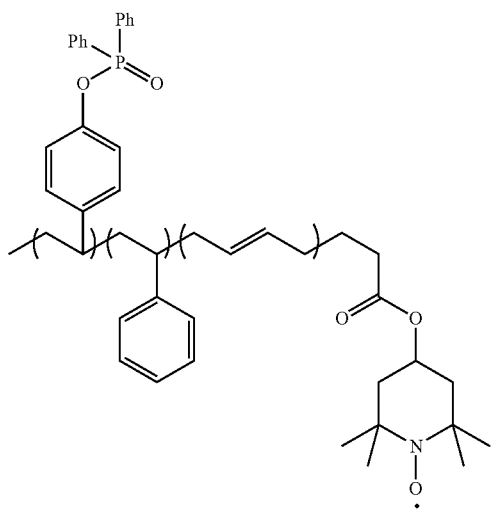
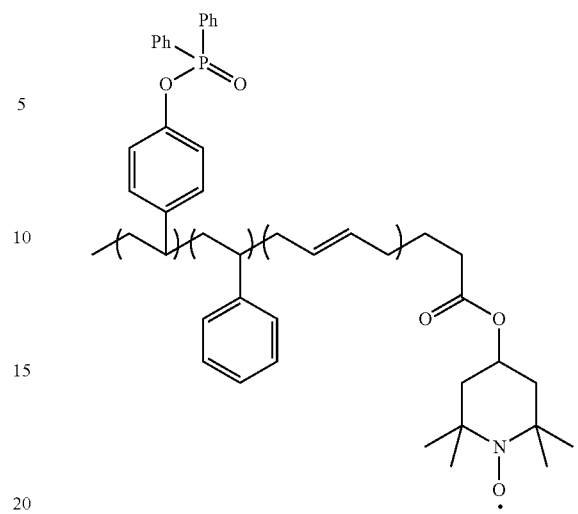

The nitroxyl radical may enable the non-halogenated FR HALS impact modifier of FIG. 12A to be bonded to a variety of polymers or polymeric blends in order to form an impact resistant, flame retardant, light-stabilized polymeric material.

Referring to FIG. 12B, a chemical reaction diagram 1210 illustrates a process of forming another example of a non-halogenated FR HALS impact modifier, according to one embodiment.

The left side of the chemical reaction diagram 1210 illustrates a mixture of monomers that includes the fourth acryloyl-functionalized TMP monomer (i.e., 2,2,6,6-tetramethylpiperidin-4-yl acrylate), a styrene monomer, a butadiene monomer, and the fourth phosphorus-functionalized styrenic monomer of FIGS. 11A/B, and 12A.

FIG. 12B illustrates that an initiator may be utilized to initiate a polymerization reaction of the mixture to form the non-halogenated FR HALS impact modifier depicted on the right side of the chemical reaction diagram 1210. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 12B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 12B to be bonded to a variety of polymers or polymeric blends in order to form an impact resistant, flame retardant, light-stabilized polymeric material.

Figure 13A:
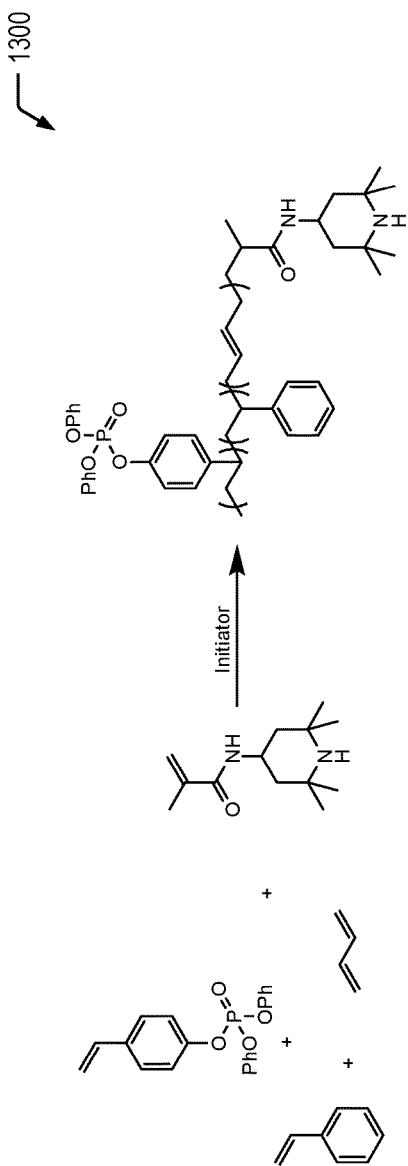
FIG. 13A is a chemical reaction diagram illustrating a process of forming a non-halogenated FR HALS impact modifier from the first acryloyl-functionalized TMP monomer (depicted in FIGS. 1A, 3A, 5A, 7A, 9A, and 11A) and a fifth phosphorus-functionalized styrenic monomer, according to one embodiment.

Referring to FIG. 13A, a chemical reaction diagram 1300 illustrates a process of forming another example of a non-halogenated FR HALS impact modifier, according to one embodiment.

The left side of the chemical reaction diagram 1300 illustrates a mixture of monomers that includes the first acryloyl-functionalized TMP monomer (i.e., N-(2,2,6,6-tetramethylpiperidin-4-yl)methacrylamide), a styrene monomer, a butadiene monomer, and a fifth phosphorus-functionalized styrenic monomer. In some cases, the fifth phosphorus-functionalized styrenic monomer of FIG. 13A may be formed according to the process described herein with respect to FIG. 16C.

FIG. 13A illustrates that an initiator may be utilized to initiate a polymerization reaction of the mixture to form the non-halogenated FR HALS impact modifier depicted on the right side of the chemical reaction diagram 1300. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 13A, in some cases, the piperidine amide bridge of the non-halogenated FR HALS impact modifier may be converted to a nitroxyl radical, as shown below:

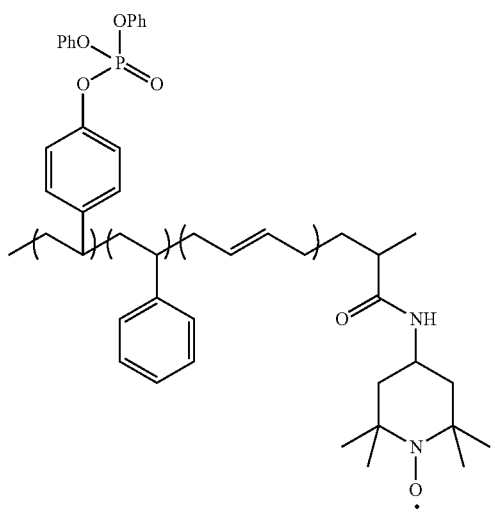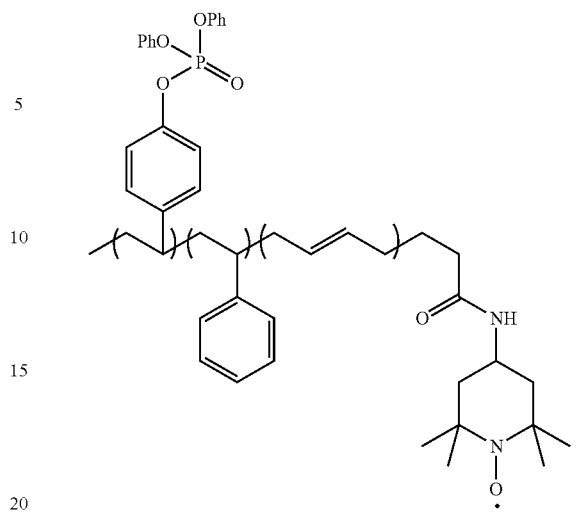

The nitroxyl radical may enable the non-halogenated FR HALS impact modifier of FIG. 13A to be bonded to a variety of polymers or polymeric blends in order to form an impact resistant, flame retardant, light-stabilized polymeric material.

Figure 13B:
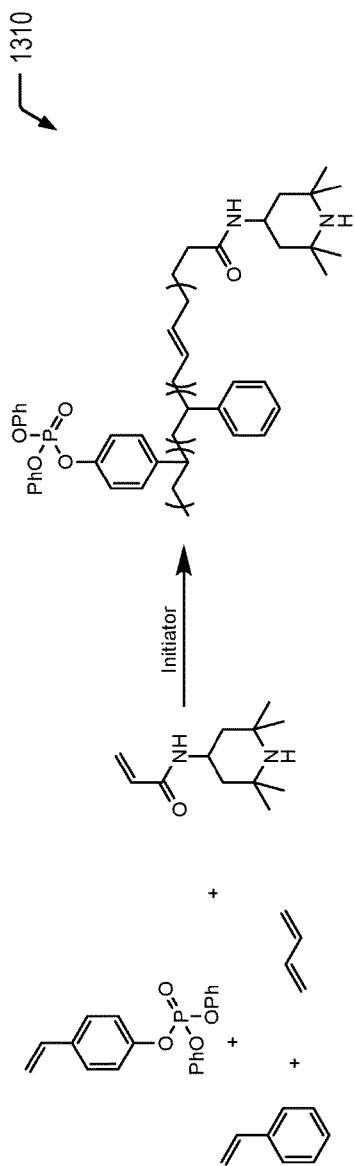
FIG. 13B is a chemical reaction diagram illustrating a process of forming a non-halogenated FR HALS impact modifier from the second acryloyl-functionalized TMP monomer (depicted in FIGS. 1B, 3B, 5B, 7B, 9B, and 11B) and the fifth phosphorus-functionalized styrenic monomer of FIG. 13A, according to one embodiment.

Referring to FIG. 13B, a chemical reaction diagram 1310 illustrates a process of forming another example of a non-halogenated FR HALS impact modifier, according to one embodiment.

The left side of the chemical reaction diagram 1310 illustrates a mixture of monomers that includes the second acryloyl-functionalized TMP monomer (i.e., N-(2,2,6,6-tetramethylpiperidin-4-yl)acrylamide), a styrene monomer, a butadiene monomer, and the fifth phosphorus-functionalized styrenic monomer of FIG. 13A.

FIG. 13B illustrates that an initiator may be utilized to initiate a polymerization reaction of the mixture to form the non-halogenated FR HALS impact modifier depicted on the right side of the chemical reaction diagram 1310. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 13B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 13B to be bonded to a variety of polymers or polymeric blends in order to form an impact resistant, flame retardant, light-stabilized polymeric material.

Referring to FIG. 14A, a chemical reaction diagram 1400 illustrates a process of forming another example of a non-halogenated FR HALS impact modifier, according to one embodiment.

The left side of the chemical reaction diagram 1400 illustrates a mixture of monomers that includes the third acryloyl-functionalized TMP monomer (i.e., 2,2,6,6-tetramethylpiperidin-4-yl methacrylate), a styrene monomer, a butadiene monomer, and the fifth phosphorus-functionalized styrenic monomer of FIGS. 13A/B.

FIG. 14A illustrates that an initiator may be utilized to initiate a polymerization reaction of the mixture to form the non-halogenated FR HALS impact modifier depicted on the right side of the chemical reaction diagram 1400. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 14A, in some cases, the piperidine amide bridge of the non-halogenated FR HALS impact modifier may be converted to a nitroxyl radical, as shown below:

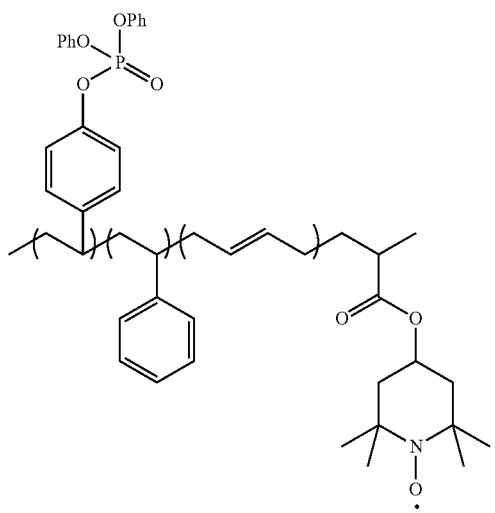
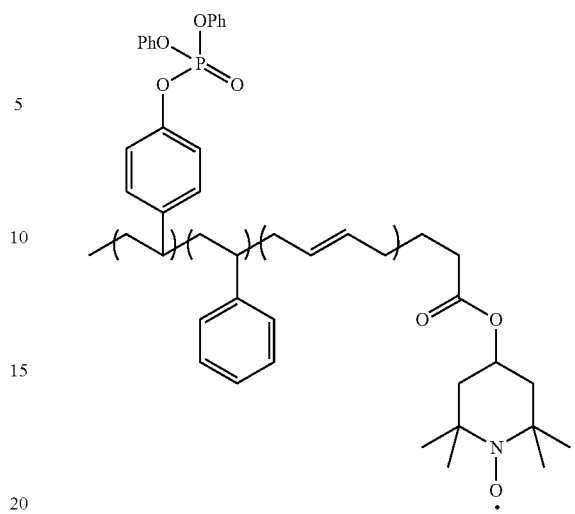

Referring to FIG. 14B, a chemical reaction diagram 1410 illustrates a process of forming another example of a non-halogenated FR HALS impact modifier, according to one embodiment.

The left side of the chemical reaction diagram 1410 illustrates a mixture of monomers that includes the fourth acryloyl-functionalized TMP monomer (i.e., 2,2,6,6-tetramethylpiperidin-4-yl acrylate), a styrene monomer, a butadiene monomer, and the fifth phosphorus-functionalized styrenic monomer of FIGS. 13A/B and 14A.

FIG. 14B illustrates that an initiator may be utilized to initiate a polymerization reaction of the mixture to form the non-halogenated FR HALS impact modifier depicted on the right side of the chemical reaction diagram 1410. In a particular embodiment, the polymerization reaction includes a RAFT polymerization reaction. It will be appreciated that other radical polymerization techniques using thermal initiators, photo-initiators, controlled radical polymerization, etc. may also be utilized.

While not shown in the example of FIG. 14B, in some cases, the piperidine amide bridge of the non-halogenated FR HALS impact modifier may be converted to a nitroxyl radical, as shown below:

The nitroxyl radical may enable the non-halogenated FR HALS impact modifier of FIG. 14B to be bonded to a variety of polymers or polymeric blends in order to form an impact resistant, flame retardant, light-stabilized polymeric material.

Figure 15A:
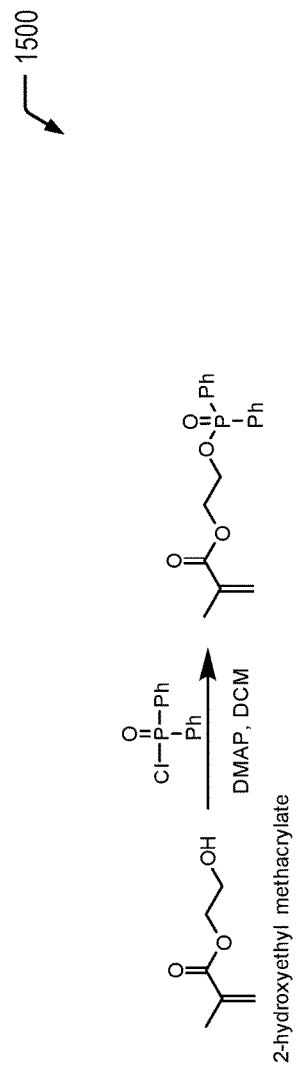
FIG. 15A is a chemical reaction diagram illustrating a process of forming the first phosphorus-functionalized acrylate monomer depicted in FIGS. 1A-1B and FIGS. 2A-2B, according to one embodiment.

FIG. 15A is a chemical reaction diagram 1500 illustrating a particular embodiment of a process of forming the first phosphorus-functionalized acrylate monomer depicted in FIGS. 1A/B and FIGS. 2A/B. In the example depicted in FIG. 15A, the first phosphorus-functionalized acrylate monomer is formed via chemical reaction of a 2-hydroxyethyl methacrylate molecule with a diphenylphosphinic chloride molecule, with dimethyl aminopyridine (DMAP) catalyst in dichloromethane (DCM) solvent. As previously described herein, the phosphorus-based flame retardant moiety depicted in the particular embodiment of FIG. 15A includes a phosphoryl group and two phenyl (Ph) groups. In alternative embodiments, one or more of the phenyl groups may be substituted by one or more alternative alkyl/aryl groups.

Figure 15B:
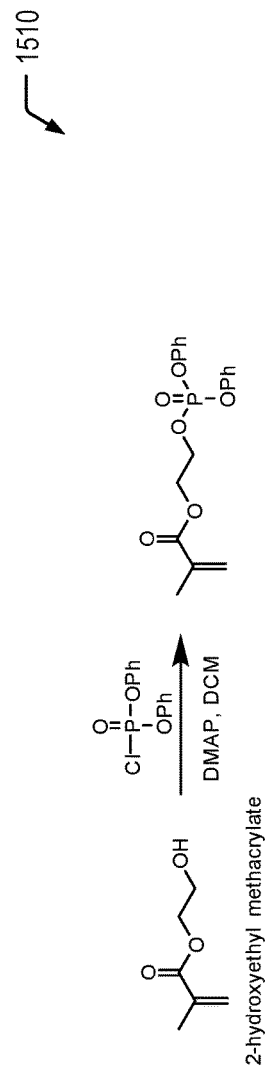
FIG. 15B is a chemical reaction diagram illustrating a process of forming the second phosphorus-functionalized acrylate monomer depicted in FIGS. 3A-3B and FIGS. 4A-4B.

FIG. 15B is a chemical reaction diagram 1510 illustrating a particular embodiment of a process of forming the second phosphorus-functionalized acrylate monomer depicted in FIGS. 3A-3B and FIGS. 4A-4B. In the example depicted in FIG. 15B, the second phosphorus-functionalized acrylate monomer is formed via chemical reaction of a 2-hydroxyethyl methacrylate molecule with a diphenyl phosphoryl chloride molecule, with DMAP catalyst in DCM solvent. As previously described herein, the phosphorus-based flame retardant moiety depicted in the particular embodiment of FIG. 15B includes a phosphoryl group and two phenoxy (OPh) groups. In alternative embodiments, one or more of the phenoxy groups may be substituted by one or more alternative groups, such as alkoxy (OR) groups.

FIG. 16A is a chemical reaction diagram 1600 illustrating a process of forming the second phosphorus-functionalized styrenic monomer depicted in FIGS. 7A/B and FIGS. 8A/B. In the example depicted in FIG. 16A, a diphenyl styrenyl phosphine molecule (corresponding to the first phosphorus-functionalized styrenic monomer of FIGS. 5A/B and 6A/B) is utilized to form the second phosphorus-functionalized styrenic monomer. As a prophetic example, p-Styryldiphenyl phosphine (1.0 equiv.) and 1,2-dichloroethane (0.2 M) may be added to a round-bottom flask. Saturated aqueous solutions of oxone (2.0 equiv.) and methanol (20% v/v) may be added to the reaction flask, and the mixture may be stirred for 2 hours. The reaction mixture and a large excess of water may be added to a separatory funnel, and the two layers may be separated. The organic layer may be retained, and the solvent may be removed in vacuo. The sticky solid may be washed with cyclohexane and then filtered. Alternatively, Diphenylphosphine oxide (1 equiv.), 4-styryl boronic acid (1.5 equiv.), NiBr$_2$ (1 mol %) and pyridine (0.15 mmol) 2,2-bipyridyl (0.075 mmol) may be dissolved in 1,2-dichloroethane and stirred at 100° C. for 24 h under an argon atmosphere (under air for 2,2-bipyridyl). The resulting mixture may be purified by silica gel chromatography using a mixture of petroleum ether and ethyl acetate as eluent.

FIG. 16B is a chemical reaction diagram 1610 illustrating a process of forming the third phosphorus-functionalized styrenic monomer depicted in FIGS. 9A/B and FIGS. 10A/B. In the example depicted in FIG. 16B, a solution of p-styryl triflate (1.0 equiv) (which may be synthesized by stirring a DCM solution of 4-vinylphenol with triflic anhydride in the presence of pyridine at 0° C.), diphenyl phosphonate (1.2 equiv), N,N-diisopropylethylamine (1.5 equiv), Pd$_2$(dba)$_3$ (5 mol %), and 1,3-bis(diphenylphosphino)propane (5 mol %) in toluene, under argon, may be stirred at 110° C. for 40 h. The mixture may be cooled to room temperature and filtered through celite. The solution may be concentrated, and purified by column chromatography on silica gel.

FIG. 16C is a chemical reaction diagram 1620 illustrating a process of forming the fourth phosphorus-functionalized styrenic monomer depicted in FIGS. 11A/B and FIGS. 12A/B. In the example depicted in FIG. 16C, triethylamine (1.2 equiv.) and N,N-dimethylaminopyridine (DMAP) (3.0 mol %) may be added to a stirred solution of 4-vinylphenol (1.0 equiv.) in 150 mL of DCM, under argon, and cooled to 0° C. A solution of diphenyl chlorophosphate in DCM (1.1 equiv.) may be added dropwise at 0° C. Upon completion of the addition, the reaction mixture may be allowed stir for 1 hour at 0° C., and may be warmed to room temperature and stirred for 16 hours. The reaction mixture may be subsequently washed twice with water, followed by 1N HCl, three additional washes of water, and brine. The organic layer may be dried over anhydrous sodium sulfate, filtered, and the solvents removed in vacuo. The product may be purified by fractional distillation.

FIG. 16D is a chemical reaction diagram 1630 illustrating a process of forming the fifth phosphorus-functionalized styrenic monomer depicted in FIGS. 13A/B and FIGS. 14A/B. In the example depicted in FIG. 16D, a reaction vessel, such as a Schlenk tube, may be charged with diphenylphosphine oxide (2.0 equiv.), 4-vinylphenol (1.0 equiv.), lithium tert-butoxide (2.0 equiv.) and CHCl$_3$ (1 M), under an inert atmosphere. The mixture may be stirred at room temperature for 30 minutes, and the volatiles may be removed in vacuo. The product may be purified from the crude mixture by being passed through a pad or column of silica gel using petroleum ether/ethyl acetate (5:1) as the eluent.

Figure 17:
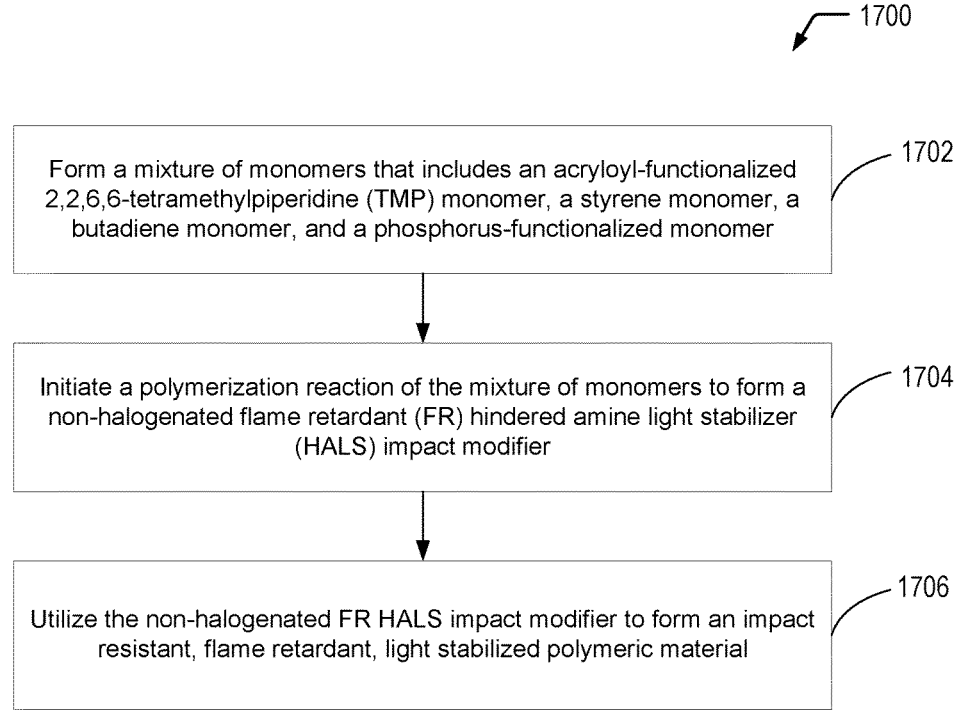
FIG. 17 is a flow diagram illustrating a particular embodiment of a process of forming a non-halogenated FR HALS impact modifier.

Referring to FIG. 17, a flow diagram illustrates an example of a process 1700 of forming a non-halogenated FR HALS impact modifier, according to one embodiment. In the particular embodiment depicted in FIG. 17, the process 1700 further includes utilizing the non-halogenated FR HALS impact modifier to form an impact resistant, flame retardant, light-stabilized polymeric material. It will be appreciated that the operations shown in FIG. 17 are for illustrative purposes only and that the operations may be performed in alternative orders, at alternative times, by a single entity or by multiple entities, or a combination thereof. As an example, one entity may form a non-halogenated FR HALS impact modifier (illustrated as operations 1702 and 1704) while another entity may utilize the non-halogenated FR HALS impact modifier to form an impact resistant, flame retardant, light-stabilized polymeric material (illustrated as operation 1706).

The process 1700 includes forming a mixture of monomers, at 1702. The mixture of monomers includes an acryloyl-functionalized TMP monomer, a styrene monomer, a butadiene monomer, and a phosphorus-functionalized monomer. As previously described herein, illustrative, non-limiting examples of acryloyl-functionalized TMP monomers include N-(2,2,6,6-tetramethylpiperidin-4-yl)methacrylamide, N-(2,2,6,6-tetramethylpiperidin-4-yl) acrylamide, 2,2,6,6-tetramethylpiperidin-4-yl methacrylate, and 2,2,6,6-tetramethylpiperidin-4-yl acrylate. Further, in some cases, the phosphorus-functionalized monomer may correspond to a phosphorus-functionalized acrylate monomer, as previously described herein. In other cases, the phosphorus-functionalized monomer may correspond to a phosphorus-functionalized styrenic monomer, as previously described herein.

As an example, FIGS. 1A-4B depict examples of co-polymerization reactions that utilize a monomer mixture that includes a phosphorus-functionalized acrylate monomer to impart flame retardancy characteristics to the resulting non-halogenated FR HALS impact modifiers. As another example, FIGS. 5A-14B depict examples of co-polymerization reactions that utilize a monomer mixture that includes a phosphorus-functionalized styrenic monomer to impart flame retardancy characteristics to the resulting non-halogenated FR HALS impact modifiers. In each case, utilizing phosphorus-based materials rather than halogenated (e.g., brominated) materials to impart flame retardancy characteristics may reduce or eliminate the loss of light stabilization associated with the release of bromine radicals from conventional brominated flame retardant additives.

The process 1700 includes initiating a polymerization reaction of the mixture of monomers to form a non-halogenated FR HALS impact modifier, at 1704. In a particular embodiment, the polymerization reaction may include a RAFT polymerization reaction. Alternatively, other radical polymerization techniques using thermal initiators, photoinitiators, controlled radical polymerization, etc. may also be utilized to form the non-halogenated FR HALS impact modifier.

In the particular embodiment depicted in FIG. 17, the process 1700 further includes utilizing the non-halogenated FR HALS impact modifier to form an impact resistant, flame retardant, light-stabilized polymeric material, at 1706. As an example, in some cases, the non-halogenated FR HALS impact modifier may represent a multiple-function additive that is blended with a polymeric material to impart impact resistivity, flame retardancy, and light stability properties to the polymeric material. In other cases, as illustrated and further described herein with respect to FIG. 18, the piperidine amide bridge of the non-halogenated FR HALS impact modifiers of the present disclosure may be converted to a nitroxyl radical, which may enable the non-halogenated FR HALS impact modifiers to be directly bonded to a variety of polymers or polymeric blends.

Thus, FIG. 17 illustrates an example of a process of forming a non-halogenated flame retardant HALS impact modifier. The non-halogenated flame retardant HALS impact modifiers of the present disclosure may be utilized to impart impact resistance, flame retardancy, and light stabilization properties to a polymeric material. In some cases, the non-halogenated flame retardant HALS impact modifiers of the present disclosure may be utilized as a multiple-function additive to a polymeric material. In other cases, as described further herein with respect to FIG. 18, the non-halogenated flame retardant HALS impact modifiers of the present disclosure may be directly bonded to a polymeric material (e.g., via conversion of the piperidine amide bridge to a nitroxyl radical).

Figure 18:
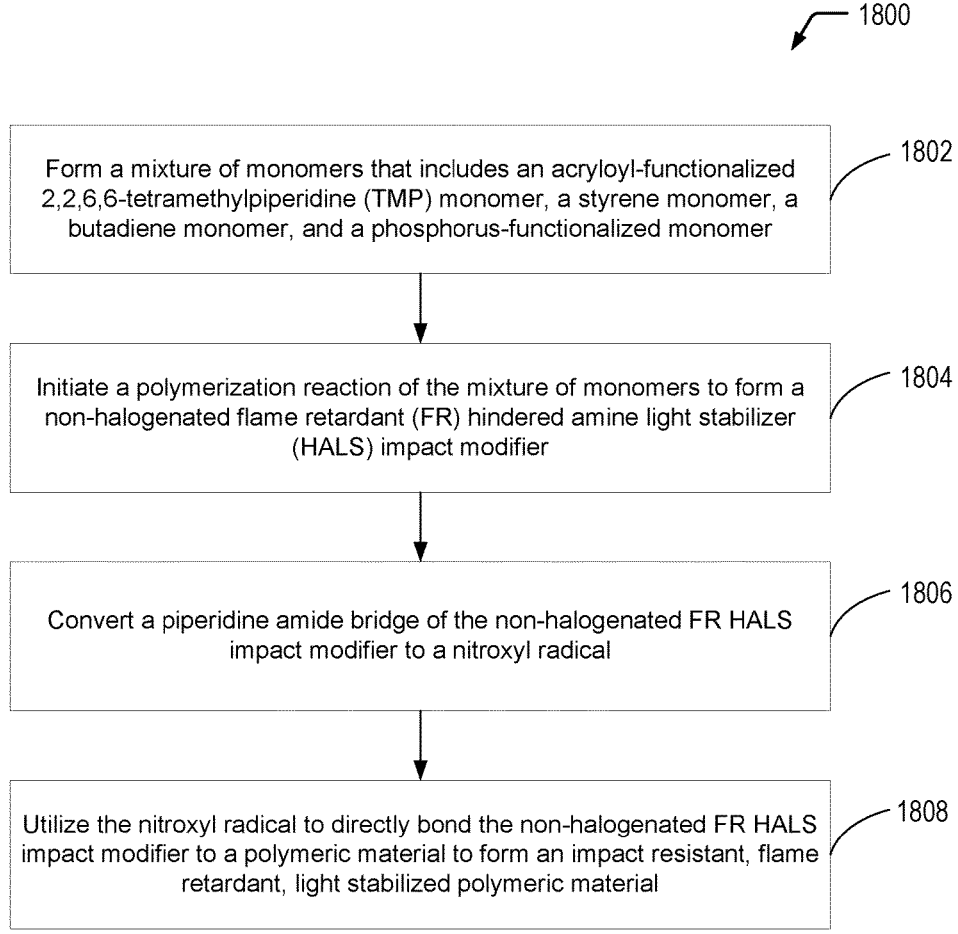
FIG. 18 is a flow diagram illustrating a particular embodiment of a process of utilizing a non-halogenated FR HALS impact modifier of the present disclosure to form an impact resistant, flame retardant, light-stabilized polymeric material.

Referring to FIG. 18, a flow diagram illustrates a particular embodiment of a process 1800 of utilizing a non-halogenated FR HALS impact modifier of the present disclosure to form an impact resistant, flame retardant, light-stabilized polymeric material. In the particular embodiment depicted in FIG. 18, the process 1800 includes converting a piperidine amide bridge (N—H) of the TMP derivative portion of the non-halogenated FR HALS impact modifier to a nitroxyl radical (N—O.). The nitroxyl radical represents a stable radical, and a TMP molecule that includes a nitroxyl radical is commonly referred to as a "TEMPO" molecule. In the particular embodiment depicted in FIG. 18, the process 1800 further includes utilizing the nitroxyl radical to form the impact resistant, flame retardant, light-stabilized polymeric material by directly bonding the non-halogenated FR HALS impact modifier to a polymeric material. It will be appreciated that the operations shown in FIG. 18 are for illustrative purposes only and that the operations may be performed in alternative orders, at alternative times, by a single entity or by multiple entities, or a combination thereof. As an example, one entity may form the non-halogenated FR HALS impact modifier (illustrated as operations 1802 and 1804), while the same entity or a different entity may form a non-halogenated FR HALS impact modifier having a stable nitroxyl radical (illustrated as operation 1806). Further, in some cases, another entity may utilize the non-halogenated FR HALS impact modifier having the stable nitroxyl radical to directly bond the non-halogenated FR HALS impact modifier to a polymeric material (illustrated as operation 1808).

The process 1800 includes forming a mixture of monomers, at 1802. The mixture of monomers includes an acryloyl-functionalized TMP monomer, a styrene monomer, a butadiene monomer, and a phosphorus-functionalized monomer. As previously described herein, illustrative, non-limiting examples of acryloyl-functionalized TMP monomers include N-(2,2,6,6-tetramethylpiperidin-4-yl)methacrylamide, N-(2,2,6,6-tetramethylpiperidin-4-yl) acrylamide, 2,2,6,6-tetramethylpiperidin-4-yl methacrylate, and 2,2,6,6-tetramethylpiperidin-4-yl acrylate. In some cases, the phosphorus-functionalized monomer may correspond to a phosphorus-functionalized acrylate monomer. In other cases, the phosphorus-functionalized monomer may correspond to a phosphorus-functionalized styrenic monomer.

As an example, FIGS. 1A-4B depict examples of co-polymerization reactions that utilize a monomer mixture that includes a phosphorus-functionalized acrylate monomer to impart flame retardancy characteristics to the resulting non-halogenated FR HALS impact modifiers. As another example, FIGS. 5A-14B depict examples of co-polymerization reactions that utilize a monomer mixture that includes a phosphorus-functionalized styrenic monomer to impart flame retardancy characteristics to the resulting non-halogenated FR HALS impact modifiers. In each case, utilizing phosphorus-based materials rather than halogenated (e.g., brominated) materials to impart flame retardancy characteristics may reduce or eliminate the loss of light stabilization associated with the release of bromine radicals.

The process 1800 includes initiating a polymerization reaction of the mixture of monomers to form a non-halogenated FR HALS impact modifier, at 1804. In a particular embodiment, the polymerization reaction may include a RAFT polymerization reaction. Alternatively, other radical polymerization techniques using thermal initiators, photo-initiators, controlled radical polymerization, etc. may also be utilized to form the non-halogenated flame retardant HALS impact modifier.

In the particular embodiment depicted in FIG. 18, the process 1800 also includes converting a piperidine amide bridge (N—H) of the non-halogenated FR HALS impact modifier to a nitroxyl radical (N—O.), at 1806. The nitroxyl radical may enable the non-halogenated FR HALS impact modifier to be directly bonded to a variety of polymers or polymeric blends.

As an example, in cases where the phosphorus-functionalized monomer corresponds to a phosphorus-functionalized acrylate monomer (as in the examples depicted in FIGS. 1A-4B), the piperidine amide bridge of a non-halogenated FR HALS impact modifier may be converted to a nitroxyl radical, as shown below:

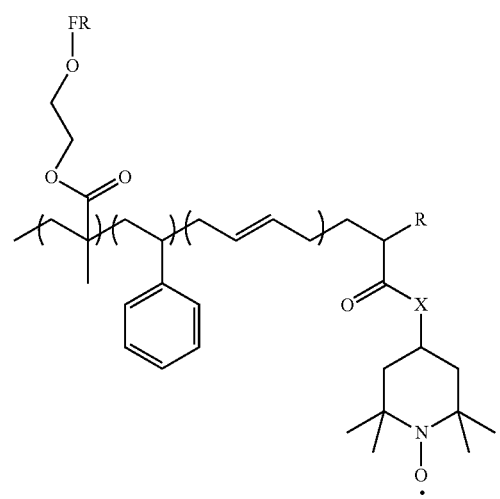

As another example, in cases where the phosphorus-functionalized monomer corresponds to a phosphorus-functionalized styrenic monomer (as in the examples depicted in FIGS. 5A-14B), the piperidine amide bridge of a non-halogenated FR HALS impact modifier may be converted to a nitroxyl radical, as shown below:

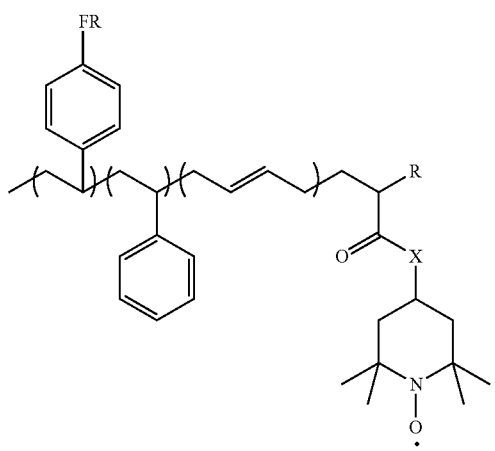

The process 1800 includes utilizing the nitroxyl radical to directly bond the non-halogenated FR HALS impact modifier to a polymeric material, at 1808. The non-halogenated FR HALS impact modifier is useful for applications where ultraviolet (UV) stability, impact resistance, and flame retardancy is desirable for the polymeric material.

Thus, FIG. 18 illustrates an example of a process of utilizing a non-halogenated flame retardant HALS impact modifier of the present disclosure to form an impact resistant, flame retardant, light-stabilized polymeric material. In the particular embodiment depicted in FIG. 18, conversion of a piperidine amide bridge of the TMP derivative portion of the non-halogenated FR HALS impact modifier to a nitroxyl radical (representing a stable radical). The nitroxyl radical may enable the non-halogenated FR HALS impact modifier to be directly bonded to a variety of polymers or polymeric blends.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A non-halogenated flame retardant hindered amine light stabilizer (HALS) impact modifier comprising:
   a first co-polymer segment formed from a phosphorus-functionalized acrylate monomer that includes a phosphorus-containing flame retardant moiety;
   a second co-polymer segment formed from a styrene monomer;
   a third co-polymer segment formed from a butadiene monomer; and
   a fourth co-polymer segment formed from an acryloyl-functionalized 2,2,6,6-tetramethylpiperidine (TMP) monomer.

2. The non-halogenated flame retardant HALS impact modifier of claim 1, wherein the acryloyl-functionalized TMP monomer is N-(2,2,6,6-tetramethylpiperidin-4-yl) methacrylamide.

3. The non-halogenated flame retardant HALS impact modifier of claim 1, wherein the acryloyl-functionalized TMP monomer is N-(2,2,6,6-tetramethylpiperidin-4-yl) acrylamide.

4. The non-halogenated flame retardant HALS impact modifier of claim 1, wherein the acryloyl-functionalized TMP monomer is 2,2,6,6-tetramethylpiperidin-4-yl methacrylate.

5. The non-halogenated flame retardant HALS impact modifier of claim 1, wherein the acryloyl-functionalized TMP monomer is 2,2,6,6-tetramethylpiperidin-4-yl acrylate.

6. A non-halogenated flame retardant hindered amine light stabilizer (HALS) impact modifier comprising:
   a first co-polymer segment formed from a phosphorus-functionalized styrenic monomer that includes a phosphorus-containing flame retardant moiety;
   a second co-polymer segment formed from a styrene monomer;
   a third co-polymer segment formed from a butadiene monomer; and
   a fourth co-polymer segment formed from an acryloyl-functionalized 2,2,6,6-tetramethylpiperidine (TMP) monomer.

7. The non-halogenated flame retardant HALS impact modifier of claim 6, wherein the acryloyl-functionalized TMP monomer is N-(2,2,6,6-tetramethylpiperidin-4-yl) methacrylamide.

8. The non-halogenated flame retardant HALS impact modifier of claim 6, wherein the acryloyl-functionalized TMP monomer is N-(2,2,6,6-tetramethylpiperidin-4-yl) acrylamide.

9. The non-halogenated flame retardant HALS impact modifier of claim 6, wherein the acryloyl-functionalized TMP monomer is 2,2,6,6-tetramethylpiperidin-4-yl methacrylate.

10. The non-halogenated flame retardant HALS impact modifier of claim 6, wherein the acryloyl-functionalized TMP monomer is 2,2,6,6-tetramethylpiperidin-4-yl acrylate.

11. A non-halogenated flame retardant hindered amine light stabilizer (HALS) impact modifier formed via a co-polymerization reaction of a mixture of monomers that includes an acryloyl-functionalized 2,2,6,6-tetramethylpiperidine (TMP) monomer, a styrene monomer, a butadiene monomer, and a phosphorus-functionalized monomer that includes a phosphorus-containing flame retardant moiety.

12. The non-halogenated flame retardant HALS impact modifier of claim 11, wherein the acryloyl-functionalized TMP monomer is N-(2,2,6,6-tetramethylpiperidin-4-yl) methacrylamide.

13. The non-halogenated flame retardant HALS impact modifier of claim 11, wherein the acryloyl-functionalized TMP monomer is N-(2,2,6,6-tetramethylpiperidin-4-yl) acrylamide.

14. The non-halogenated flame retardant HALS impact modifier of claim 11, wherein the acryloyl-functionalized TMP monomer is 2,2,6,6-tetramethylpiperidin-4-yl methacrylate.

15. The non-halogenated flame retardant HALS impact modifier of claim 11, wherein the acryloyl-functionalized TMP monomer is 2,2,6,6-tetramethylpiperidin-4-yl acrylate.

16. The non-halogenated flame retardant HALS impact modifier of claim 11, wherein the phosphorus-functionalized monomer includes a phosphorus-functionalized acrylate monomer.

17. The non-halogenated flame retardant HALS impact modifier of claim 11, wherein the phosphorus-functionalized monomer includes a phosphorus-functionalized styrenic monomer.

* * * * *